United States Patent
Fraser

(10) Patent No.: US 10,986,030 B2
(45) Date of Patent: Apr. 20, 2021

(54) CONGESTION CONTROL

(71) Applicant: Netduma Software, LTD., London (GB)

(72) Inventor: Iain Kibet Fraser, Cambridge (GB)

(73) Assignee: NETDUMA SOFTWARE, LTD., London (GB)

( * ) Notice: Subject to any disclaimer, the term of this patent is extended or adjusted under 35 U.S.C. 154(b) by 7 days.

(21) Appl. No.: 16/665,780

(22) Filed: Oct. 28, 2019

(65) Prior Publication Data

US 2020/0112514 A1 Apr. 9, 2020

Related U.S. Application Data

(63) Continuation-in-part of application No. 15/684,930, filed on Aug. 23, 2017, now Pat. No. 10,715,442.

(60) Provisional application No. 62/378,664, filed on Aug. 23, 2016.

(51) Int. Cl.
*H04L 12/807* (2013.01)
*H04L 12/917* (2013.01)
*H04L 12/815* (2013.01)

(52) U.S. Cl.
CPC ............ *H04L 47/27* (2013.01); *H04L 47/225* (2013.01); *H04L 47/76* (2013.01)

(58) Field of Classification Search
CPC ........ H04L 47/27; H04L 47/76; H04L 47/225
See application file for complete search history.

(56) References Cited

U.S. PATENT DOCUMENTS

| | | | |
|---|---|---|---|
| 7,236,459 B1 | 6/2007 | Okholm et al. | |
| 8,966,457 B2 | 2/2015 | Ebcioglu et al. | |
| 9,455,927 B1* | 9/2016 | Nayak | H04L 47/2416 |
| 10,581,746 B2 | 3/2020 | Fraser | |
| 2005/0083840 A1 | 4/2005 | Wilson | |
| 2005/0286522 A1 | 12/2005 | Paddon et al. | |
| 2007/0064604 A1* | 3/2007 | Chen | H04L 1/0002 370/230 |
| 2008/0112320 A1 | 5/2008 | van Willigenburg | |
| 2008/0253333 A1* | 10/2008 | Hong | H04W 28/20 370/331 |
| 2010/0002700 A1 | 1/2010 | Simpson, Jr. | |
| 2010/0246602 A1 | 9/2010 | Barreto et al. | |
| 2011/0019555 A1 | 1/2011 | Gotoh et al. | |
| 2013/0090115 A1 | 4/2013 | Deivasigamani et al. | |
| 2013/0114408 A1 | 5/2013 | Sastry et al. | |
| 2014/0003261 A1 | 1/2014 | Gillett et al. | |
| 2014/0192639 A1 | 7/2014 | Smirnov | |
| 2014/0376451 A1 | 12/2014 | Sterman | |

(Continued)

OTHER PUBLICATIONS

Author: Jacobson, Guy Title: "Space-efficient Static Trees and Graphs" 30th Annual Symposium on Foundations of Computer Science, 1989 IEEE, pp. 549-554.

*Primary Examiner* — Harry H Kim
(74) *Attorney, Agent, or Firm* — David Lewis

(57) ABSTRACT

In an embodiment, header information of messages is altered to specify a window within which to receive information, so that the messages sent by a remote device will be sent at a rate that a network can receive messages. The sending of acknowledgements of messages are paced to control window growth. Bandwidth is allocated to a plurality of flows such that the satisfied flows require less bandwidth than an amount of bandwidth allocated to each unsatisfied flow.

8 Claims, 20 Drawing Sheets

(56) References Cited

U.S. PATENT DOCUMENTS

| | | |
|---|---|---|
| 2015/0365325 A1 | 12/2015 | Hwang et al. |
| 2018/0131613 A1 | 5/2018 | Fraser |
| 2018/0316992 A1* | 11/2018 | Zheng ................ H04Q 11/0067 |
| 2020/0197794 A1 | 6/2020 | Fraser |

* cited by examiner

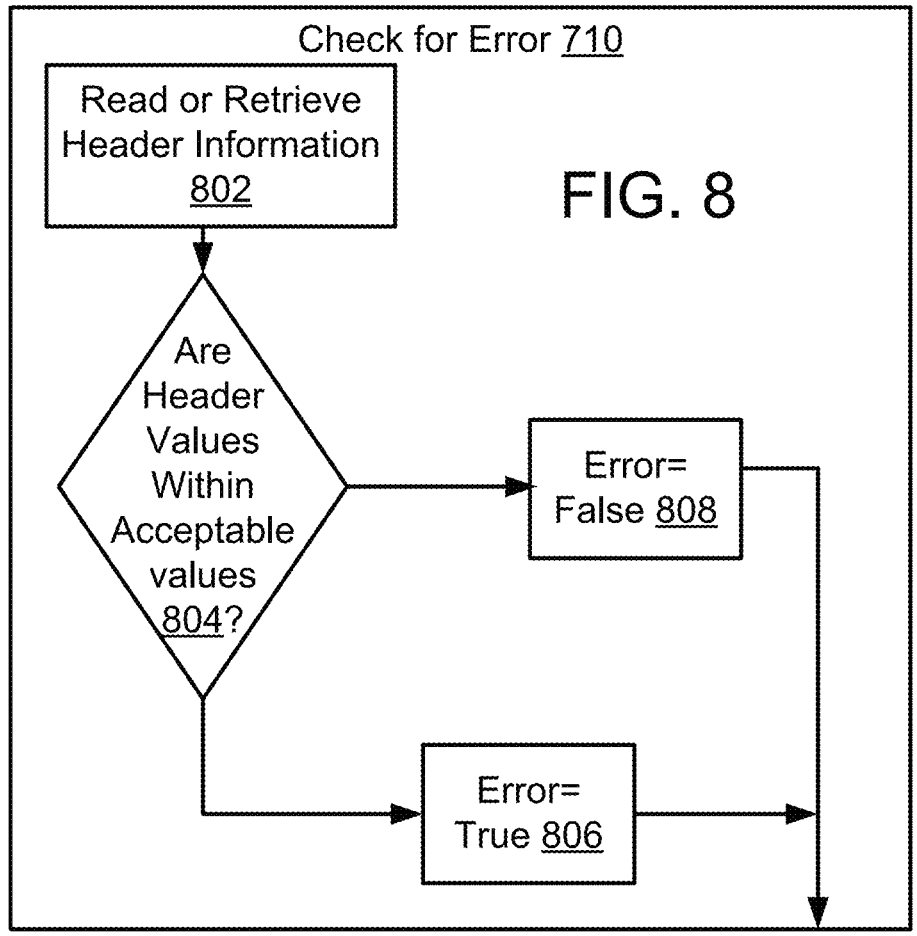
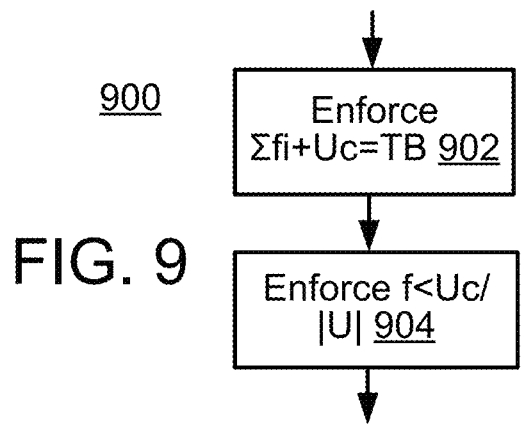

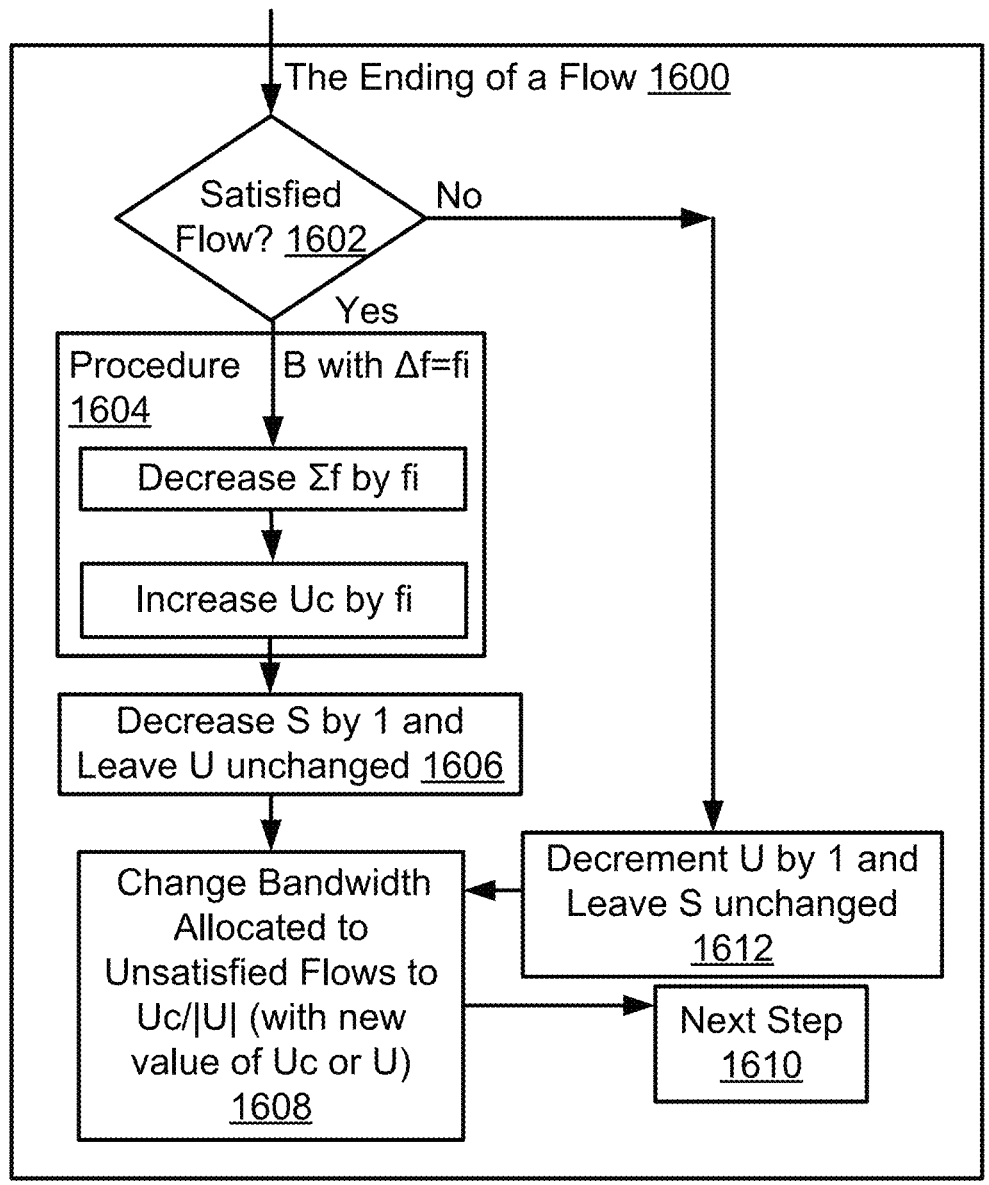
FIG. 16A(1)

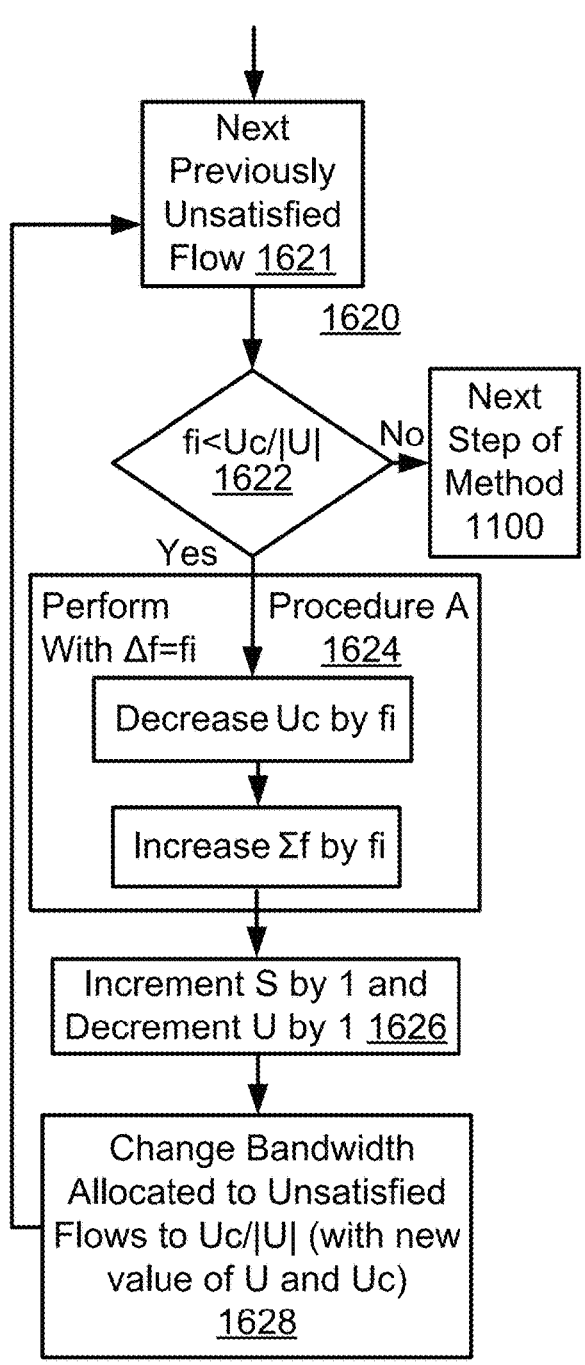
FIG. 16A(2)
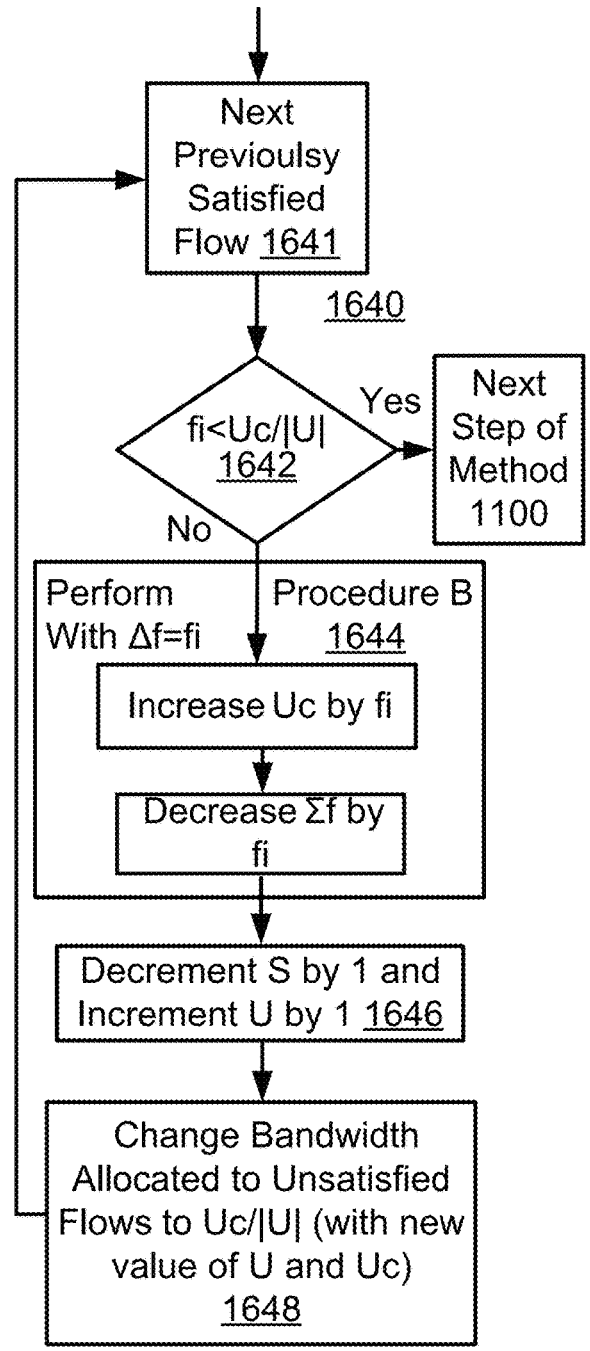
FIG. 16A(3)
FIG. 16A(4)
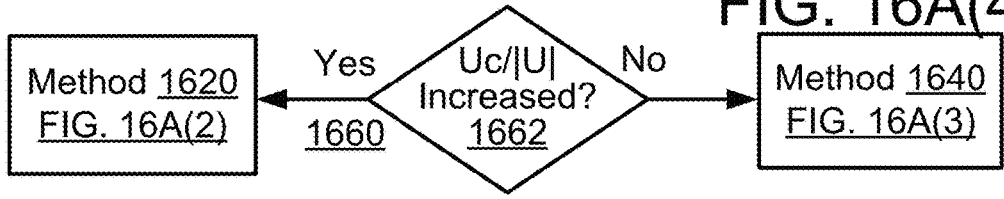

CONGESTION CONTROL

CROSS REFERENCE TO RELATED APPLICATIONS

This application is a continuation-in-part of U.S. patent application Ser. No. 15/684,930, entitled "CONGESTION CONTROL," filed on Aug. 23, 2017, by Iain Kibet Fraser, which claims priority benefit of U.S. Provisional Patent Application No. 62/378,664, entitled "CONGESTION CONTROL," filed on Aug. 23, 2016, by Iain Kibet Fraser, which are each incorporated herein by reference.

FIELD

This specification generally relates to controlling congestion in network traffic.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

U.S. Pat. No. 7,236,459 is related to this specification, which discusses delaying the sending of acknowledgements of messages (commonly referred to as "acks") on the server side.

BRIEF DESCRIPTION

In the following drawings like reference numbers are used to refer to like elements. Although the following figures depict various examples of the invention, the invention is not limited to the examples depicted in the figures.

FIG. 8 shows a flowchart of an embodiment of a method for implementing an error check of what may be one of the steps of FIG. 7, which may also be performed by the RTT determination module of FIG. 2.

FIG. 9 shows a flowchart of an embodiment of a method for allocating bandwidth.

FIG. 16A(1) shows a flowchart of an embodiment of method of handling the cessation of a flow.

FIG. 16A(2) shows an embodiment of a method of checking the categorization of the flows when the ratio of Uc/|U| has increased.

FIG. 16A(3) shows an embodiment of a method 1640 of checking the categorization of the flows when the ratio of Uc/|U| has decreases.

FIG. 16A(4) shows an embodiment of a method of categorizing flows, which may be an embodiment of a step of the method of FIG. 11.

Figure 1:
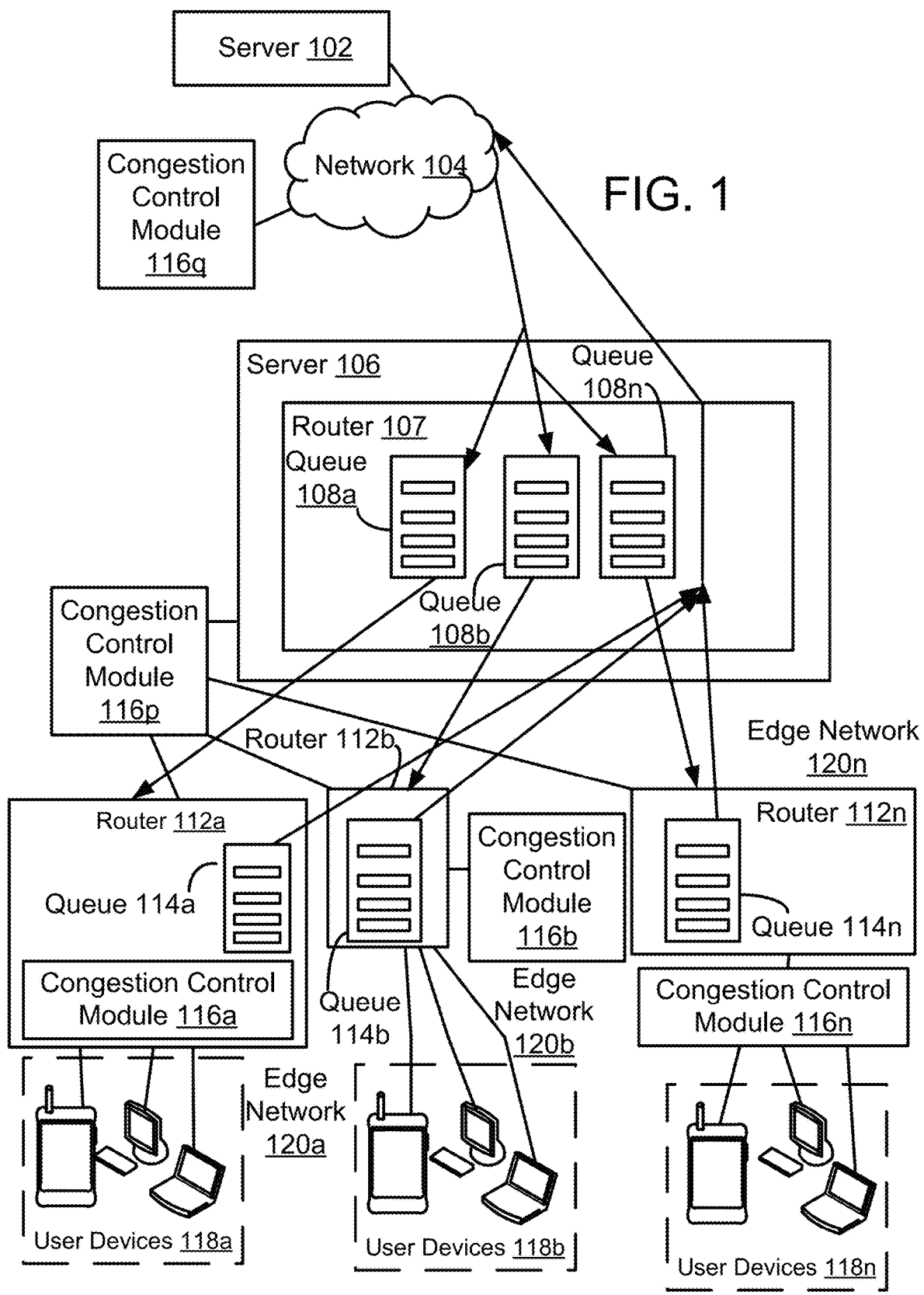
FIG. 1 shows a system within which one or more congestion control modules may be deployed.
Figure 19A:
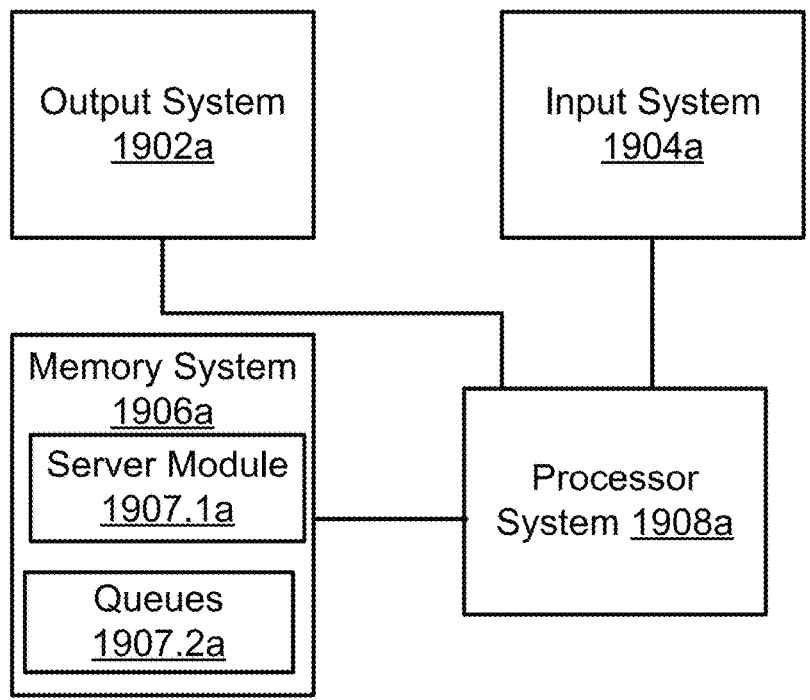
Figure 19B:
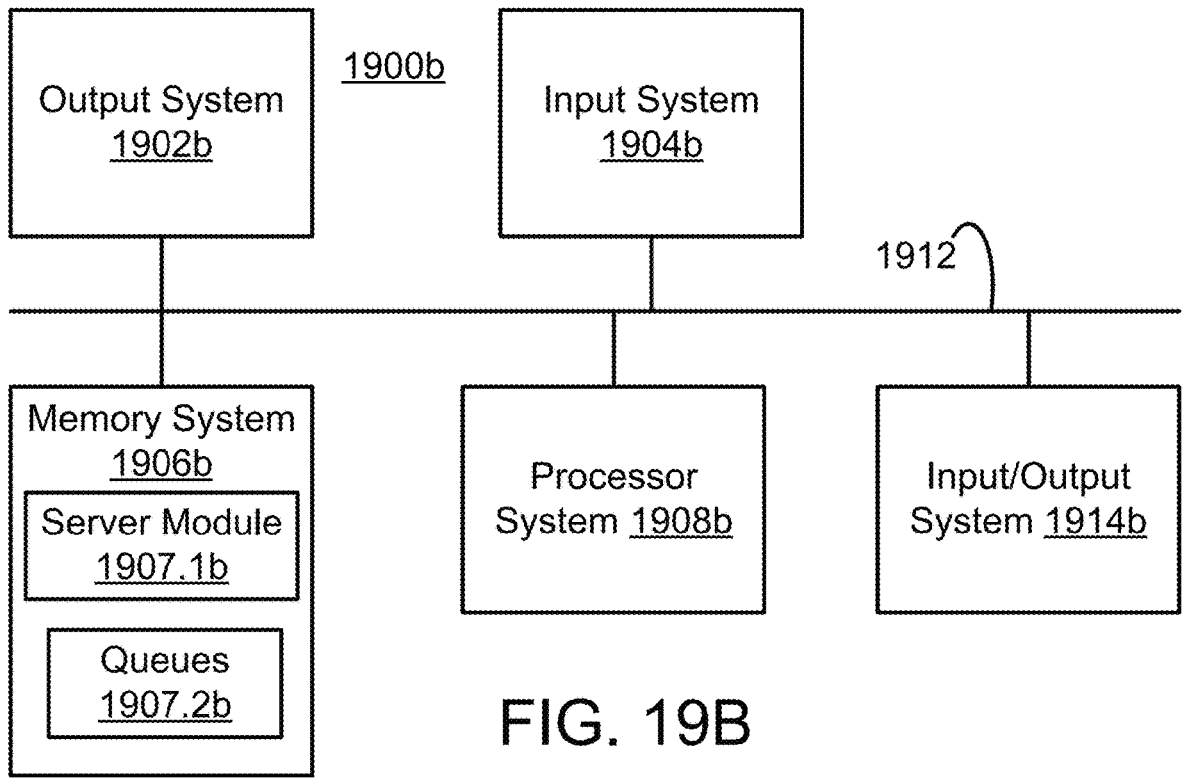

FIGS. 19A and B shows a block diagram of a console used in the system of FIG. 1.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Although headings are included and although in general the FIGs. are discussed in numerical order and each element of each FIG. is discussed in numerical order, information about any element, FIG., and/or topic may be found anywhere in the specification including under headings that appear to be unrelated to that information or in discussing other seemingly unrelated elements and/or FIGs.

Techniques and systems for reducing latency and bursts and the fair allocation of bandwidth within a network are discussed. RFC 793, 879, and 2460 are incorporated herein by reference in their entirety.

In this specification, the term module refers to a hardware unit, logical circuits, a module of computer code, and/or firmware, or any combination thereof. To construct electrical circuits embodiments of the modules, the methods disclosed in U.S. Pat. No. 8,966,457 B2, which is incorporated herein by reference, and/or similar methods, may be used to convert the algorithms disclosed to electrical circuits.

FIG. 1 shows a system 100 within which a congestion control module may be deployed. System 100 includes other services server 102, network 104, Internet Service Provider (ISP) server 106, queues 108a-n, routers 112a-n, queues 114a-n, congestion control modules 116a-p, user devices 118a-n, and edge networks 120a-n. In other embodiments, system 100 may not necessarily include of the elements listed above and/or may include other components in addition to and/or instead of those listed above.

System 100 is a system in which congestion may occur. System 100 may be used by users for accessing content and/or services, via a network, such as online games, streaming media, and/or other content.

Other Services Server 102

Other services server 102 provides services and content to users. Other services server 102 may include an online game site, which users interact with. Other services server 102 provides services and/or content for which latency and/or bursts of messages disrupt the content being received and degrades the user experience. Although only one other services server 102 is shown there may be any number of content servers and other services servers. Other services server 102 is one example of a remote server (a server that is remote from the user).

Network 104

Network 104 is any combination of wide area network, local area network, phone lines, wireless network and/or other network in which messages are sent in providing the content and/or services the user is accessing. In an embodiment network 104 is the Internet (the Internet is essentially a network of many computer networks) or other Wide Area Network (WAN). Network 104 may be a network in which Transmission Control Protocol (TCP) is used commonly for network communications (or other network protocol that has the same features that are relied upon in describing the features of elements of this specification). For example, any protocol in which the (1) window size is indicated in the header of messages or is exchange via other messages (2) the closing of a window is affected by sending of an acknowledgement may be used for the aspects related to reducing queuing and latency. Whereas the discussion of the how to allocate bandwidth between multiple flows can be used with other protocols (e.g., with any client/server protocol). TCP is a protocol that has been adopted by the majority of Internet traffic. TCP makes up the core protocol of the Internet Protocol Suite, which may complement the Internet Protocol (IP). TCP provides reliable, ordered, and error-checked delivery of a stream of packets between applications running on hosts communicating over an IP network. The TCP may be the protocol that major Internet applications, such as the World Wide Web, email, remote administration and file transfer, rely on (in contrast, applications that do not require reliable data stream service may use the User Data Protocol (UDP) or a similar protocol that provides a connectionless datagram service that emphasizes reduced latency over reliability).

Server 106

Server 106 may be any server. For example, server 106 may be server of a service provider that provides end user with access to network 104 allowing end users to access the content and/or services at remote servers, such as other services server 102 (or server 106 may be another server). server 106 receives messages, via network 104, from other services server 102 and forwards/sends the messages to local networks, which may be referred to as edge networks. Edge networks are networks on the Internet that are near the edge of the Internet. An example of an edge network is a network in a residential home. Although FIG. 1 shows server 106 connecting directly with routers of edge networks, server 106 may communicate with edge networks, via network 104. Although FIG. 1 shows other services server 102 and ISP sever 106 as separate entities, server 106 and other services server 102 may be the same and/or server 106 may provide services and content that is the same as or similar to other services server 102.

ISP Router 107

Router 107 is a router located at server 106, which controls the flow of traffic to the different edge networks (which may be a router of a service provider or of another type of server). Router 107 may be located elsewhere in the network 104. The term "flow" is used to refer to the flow of messages over a network connection. However, the term "flow" may also refer to the device or process to which the messages are sent or the bandwidth required to accommodate the messages being sent at the rate that the device or process is ready to receive the messages. The term "bandwidth" refers to that maximum rate at which data may be received, which has units of unit of information (such as bits) per unit of time. For example, bandwidth may be measured in bits per second, Mega Bits per second, Mega Bytes per second, Tera Bytes per hour, etc.

Queues 108a-n

Queues 108a-n are queues of incoming messages that are waiting to be sent to the users, via the edge networks. Ideally queues 108a-n are kept essentially empty, so as to minimize bursts and latency. When queues 108a-n are full and a new message is received, the message is dropped and needs to be resent. Queues 108a-n may be located on router 107. Queues 108a-n store messages being downloaded until the messages can be processed. Server 106, may be able to process messages at a faster rate than the bandwidth available to the recipient can handle.

Routers 112a-n and Queues 114a-n

Routers 112a-n rout messages from server 106 to the users. Routers 112a-n may act as the gate way to a user's local network. Queues 114a-n, similar to queues 108a-n, store outgoing messages that are waiting to be sent by routers 112a-n. Ideally queues 114a-n are also kept essentially empty. Routers 112a-n process messages faster than the bandwidth available to the routers 112*a-n* allows the messages to be sent. A network bottleneck (which may at times be referred to as just "bottleneck") is when a faster network connects to a slower network or device. For example, if there is a 1000 mbits/sec network connected to 100 mbit/sec network, a bottle neck is created at the connection, and the router connecting the two networks is the bottleneck. If the 1000 mbit/sec network is transferring data at full speed, then for every 10 mbits that the 1000 mbit network sends to the 100 mbit network, the router can only transmit 1 mbit onto the slower network. Instead of just dropping all the packets that are received quicker than the routers 112*a-n*, routers 112*a-n* may queue the packets (until the queues are full, after wards the packets may be dropped).

Server 106, after sending a certain number of messages, may wait for acknowledgements that the messages sent were received, before sending more messages. Since the packets are queued, server 106 may send a large number of messages at the fast rate it is capable of sending messages, wait for an acknowledgement, which does not come until the messages are processed, and then once the acknowledgment is received send many more messages, resulting in bursts of packets being transmitted to the slower network. If (e.g., during a burst) the transmission rate is too high, the queue will fill up and then drop packets. The dropped packets signal congestion, which will be discussed in more detail later. The time the messages spend in a queue can add a significant latency to the traffic (that is to the receipt the messages). A high latency is bad for interactive or real-time applications, such as video games, Voice over IP (VOIP), streaming video, etc. On an edge network, there may be a bottleneck in both directions. In the upload direction, although the home's LAN network typically has at least 100 mbit/sec capacity (with 1000 mbit/sec and beyond becoming quite common), the upload speed from the ISP is usually in single digit megabits (at the time of writing this specification) and thus the routes 112*a-n* may be able to send messages much quicker than server 106 can handle as a result of the small amount of bandwidth available for uploading, and the messages may be queued in queues 114*a-n*, which waiting to be uploaded.

Since, there may be multiple bottlenecks within the system, the bottlenecks are most easily described as a net bottleneck in the downstream direction and a net bottleneck in the upstream direction, and the total number of devices contributing to the bottleneck does not have to be identified in order to implement the techniques of the specification.

Congestion Control Modules 116*a-p*

Congestion control modules 116*a-p* reduce (or eliminate) congestion compared to the amount of congestion that would be present without congestions control modules 116*a-p*. Congestion control modules 116*a-n* reduce degree to which messages are queued at routers 112*a-n*, server 106, and/or elsewhere in the communication path between the user, and congestion control modules 116*a-n* also control the allocation of bandwidth to help ensure that when there is not enough bandwidth to satisfy all user devices, bandwidth is allocated fairly between users. Congestion control modules 116*a-n* may be built into, that is included within, routers 112*a-n* (e.g., see congestion control module 116*a*), or standalone devices (e.g., see congestion control module 116*b* and 116*n*). Congestion control modules 116*a-n* may interrupt and/or monitor the flow of messages between routers 112*a-n* and user devices 116*a-n* to control the flow of messages. Congestion control modules 116*a-n* may intercept messages sent from user devices 116*a-n* to routers 112*a-n* to control the flow of messages. Similarly, congestion control modules 116*o* may intercept messages sent from routers 112*a-n* to server 106 to control the flow of messages. Also, congestion control modules 116*p* may intercept messages sent from other services server 102 to ISP serer 106 to control the flow of messages.

User Devices 118*a-n*

User devices 118*a-n* include any of a number of different types of user devices. User devices 118*a-n* communicate with other services server 102, via network 104, Server, 106, and routers 112*a-n*, respectively. Some of user devices 118*a-n* may send messages to server 106, via routers 112*a-n* (or send messages to other server 102), via routers 112*a-n* and via server 106), using TCP, UDP or a mixture of TCP and UDP.

Edge Networks 120*a-n*

Edge networks 120*a-n* are local area networks that connect to network 104, via server 106. The combination of user devices 118*a-n* and routers 116*a-n* make up edge networks 120*a-n*, respectively. Bottlenecks may occur at routers 116*a-n*, or elsewhere degrading the user experience users using user devices 118*a-n* within edge networks 120*a-n*, respectively. Other services server 102, server 106, routers 112*a-n*, and at least some of user devices 118*a-n* may communicate with one another using TCP.

Further Discussion of FIG. 1

FIG. 1 shows an illustrative model of residential networks connected to the Internet, or other network, with bottleneck queues. For each of the customer's downstream queue (queues 108*a-n*) at the server 106, there is an upstream queue (one of queues 114*a-n*) on the customer router (e.g., one of routers 112*a-n*, the upstream queue—one of queues 108*a-n*—may be stored on Customer Provided Equipment (CPE)). Although the network's router that connects to the home network is the bottle neck in the download direction, the home router, one of routers 112*a-n*, is the bottleneck in the upload direction, since the queue (one of queues 114*a-n*) is on the home network, one solution is to allow interactive and real-time applications to bypass the queue. However, in the download direction, the server 106 typically has a fat data pipe connecting to the slower speed network router that the server 106 gives to each customer, and consequently the bottleneck may be located on a remote router (e.g., router 107) controlled by the ISP.

To minimize the download queue at the ISP router (e.g., router 107), while retaining high throughput, theoretically, if one can get the total download rate from the Internet to be the exact download speed allocated to the customer (who has the slower link) there may be no queuing, which will remove or at least significantly reduce the bursts in transmission, the dropping of packets due to queues 108*a-n* or 114*a-n* filling up, and the resulting latency. In an embodiment, congestion control module 116*o*, and optionally and optionally congestion modules 116*a-n* and *p*, implement a method that modifies the flow the messages, so that the total amount of information sent, during a particular duration of time, or the rate at which messages are sent, does not exceed the download speed. If the rate at which messages are sent is perfectly matched to the download rate, the user would notice no difference to the download speed and a significant reduction in latency.

In an embodiment, congestion control module 116*o* may intercept messages sent between server 106 and users 118*a-n* (at edge networks 120*a-n*), where the header information of the messages is changed so that server 102 behaves as if the messages came from users 118*a-n*, so as to regulate the bandwidth and control the flow rate of the messages. The router 112*a-n* or the router at ISP 106 can change header information and the receiver (server 102) will "believe" the information was sent by one of the user devices 118a-n. More accurately, server 102 does not detect any indication that the header information was changed and/or behaves as if the header information received is the original header information. Server 106 may have no indication that messages are being modified by congestion control module 116o and may behave as if the messages are sent from user devices 118a-n, without modification by congestion control module 116o are coming directly, via routers 112a-n.

In and embodiment, ISP sever 106 is a server of a network interface provider, which includes a congestion control module and server 102 is a server. Server 106 may include router 107. Router 107 intercepts messages sent to and from users 118a-n, via routers 112a-n (at edge networks 120a-n) and sends messages to server 102, where the header information of the messages is changed, so that server 102 behalves as if the messages came from users 118a-n (via routers 112a-n), so as to regulate the bandwidth and control the flow rate of the messages. Optionally, router 107 is not necessarily located at server 106 and/or is not part of the ISP.

Similarly, if the congestion control module (e.g., congestion control module 116b or 116n) is not part of the home router (e.g., router 112b or 112n), congestion control module may intercept messages sent to and from user systems 118a-n (at edge networks 120a-n) and send messages via the router (e.g., router 112b or 112n), where the header information changes so that router behalves as if the messages came from the user device (e.g., user devices 118b or n), so as to regulate the bandwidth and control the flow rate of the messages. Similarly, a congestion control module could be installed on server 106, which may act as an interface server between user devices 118a-n and other services server 102, which may behave as if the connected directly to the user devices and communicate with the other services server 102, via the server of the network interface provider (e.g. server 106). Note that optionally the destination in the header information may also be changed for other reasons, such as part of Network Address Translation (NAT), which may be performed to reroute a message without giving new addresses for the servers in the new route or which may be used to conserve IP addresses, where a collection of addresses (e.g., private addresses) are hidden behind or represented by a single address (e.g., an address of a public location).

Alternatively, congestion control module 116p may intercept messages sent to and from server 106 and send messages to other services server 102, where the header information of the messages is changed, so that server 102 behalves as if the messages came from user devices 118a-n, so as to regulate the bandwidth and control the flow rate of the messages. In an embodiment, the only time the routers may need to generate a packet and pretend to be another device is during the acknowledgement pacing. During acknowledgement pacing, the packets are generated at timed intervals and are therefore generated at the routers and the routers pretend/masquerade as the original sender.

The server 106 may have no indication that it is actually communicating with the network interface provider's system, congestion control module 116a-n, and behaves as if communicating directly with user devices 118a-n, via the routers 112a-n. Similarly, users 118b or n may be communicating, via router 112b or n, with congestion control modules 116b or n, but behave as if communicating directly with user devices 118b or n, respectively, because congestion control modules 116b or n may intercept communications sent via routers 112b or n to or from user devices 118b or n, respectively, where the messages that have been modified to appear as if the messages come directly from user devices 118b or n, respectively.

Regarding bottlenecks in downloading messages from the ISP's server at the routers of the edge networks, modules implementing the techniques disclosed in this specification may reside at the routers (routers 112a-n) of the edge networks and may be used to control the rate at which messages are sent and the allocation of bandwidth between the different users of the ISP associated with the network interface. In an alternative embodiment, the module may reside on a device other than a router, but that is capable of inspecting, intercepting, and altering any message sent between the edge network and the system (e.g., server 106) with which the edge network is communicating and/or between the user devices 118b or n via the routers 112b or n.

Congestion control modules 116a-p (and any other systems of this specification for controlling congestion) controls the sending rate of the TCP (or similar protocol), so as to reduce the sending rate of data to the home network or any other edge networks 120a-n, and controls and preferably eliminates the queuing at the routers of server 106 (e.g., router 107) and/or routers 114a-n. TCP has a built-in congestion control mechanism. Manipulating the TCP's built in congestion mechanism (e.g., using congestion control modules 116a-p) allows the sending rate of a remote server to be manipulated. As alluded to above (e.g., in conjunction to network 104), TCP is a protocol that prioritizes reliability, by prioritizing the avoidance of dropping packets. The TCP avoids dropping packets by assigning an increasing number to each segment of a message that is sent. In this specification, when referring to TCP, the terms "segment" and "message" are used interchangeably. Any place in the specification where "message" or "segment" is used one may be substituted for the other to obtain a different embodiment. The receiver sends an acknowledgement that includes the number assigned to the message received to let the sender know that the message arrived and was not ben dropped. If the acknowledgement does not arrive within a certain time period, the assumption upon which the TCP based software is configured is that messages may be lost, and that the sender automatically retransmits the messages (e.g., if not acknowledgement of the message is received within a predetermined amount of time) in case the message was lost. However, an issue is that TCP based communications algorithms do not detect, track, or at least initially do not make efficient use of, the end-to-end bandwidth when communicating with another computer on the Internet. To obtain an approximation of the end-to-end bandwidth, the TCP continually increases the sending rate until a dropped message is detected. The dropped message is assumed to be an indication of congestion, and the dropping of the message is assumed to have resulted from the queue becoming too large at a bottleneck somewhere. The TCP sender reduces the sending rate by half and starts probing for the bandwidth again by again determining at which point a message is dropped. The combination of the probing, halving the send rate, and then probing again makes the sending rate of a TCP connection have a graph (of send rate vs. time) that has a saw tooth shape. The halving of the send rate and the probing of the bandwidth allows the TCP to work with heterogeneous networks. The TCP algorithm utilizes the bandwidth and without being so greedy as to cause congestion collapse (e.g., similar to a traffic jam on the road). However, a problem with the over-probing that is built into the standard TCP is that the bursts and queuing created by the TCP to avoid congestion, are exactly some of the elements that are undesirable about congestion.

However, because the home (or other edge network) is on an edge network (or is at a network where one happens to know the bottleneck speed for other reasons, such as at a data center) more information is available than the TCP algorithm assumes is known, and consequently there is no need to probe to find the bottleneck speed. The extra information, the rate of transmission to the edge network, may be used to determine at what rate to cause the sender to send data. The probing is applied using a technique that may be referred to in this specification as windows. The window is the maximum amount of data a device implementing TCP will send without receiving an acknowledgement. Windows are typically about 64 Kb or much more now-a-days. However, as a simple example, assume that the window is the size of 10 packets and assume that the sender just received an acknowledgement for packet 215. Since the window is the maximum data that is sent without receiving an acknowledgement, one can now send up until packet 215+10=225, without the lack of an acknowledgement triggering a change in the rate at which the packets are sent. To clarify, the prior example works on the byte level not on the packet level, but the example should nonetheless be useful.

Also just to clarify, when a system receives a new acknowledgement, the window slides forwards in time, meaning that the window stays open and the length of time until the window closes is extended. On a time axis of a graph in which time increase as one travels to the right along the time axis, the window slides to the right, allowing more data to be sent. The sender's window grows with time, meaning that more data can be sent at once and the rate that the protocol (e.g., TCP) allows the data to be sent increases. When a dropped packet is detected, in TCP, the sender's window is halved, which to some extent controls the congestion. As another additional detail that is useful for understanding the discussion that follows, the receiver also has a window which is determined by the maximum amount of data the receiver is willing to receive at once. The window is the minimum of the sender's window and the values of window for the data that is sent by the receiver. In other words, the window used by the sender is the minimum of the window the sender would like to set using the TCP (or other protocol) algorithm (of increasing the window size until a packet is dropped, at which point the server's window is halved) and the window size indicated in the acknowledgment sent by the receiver as the maximum amount of data the router (e.g., any one of routers 112$a$-$n$) can accept or would like to accept.

Figure 2:
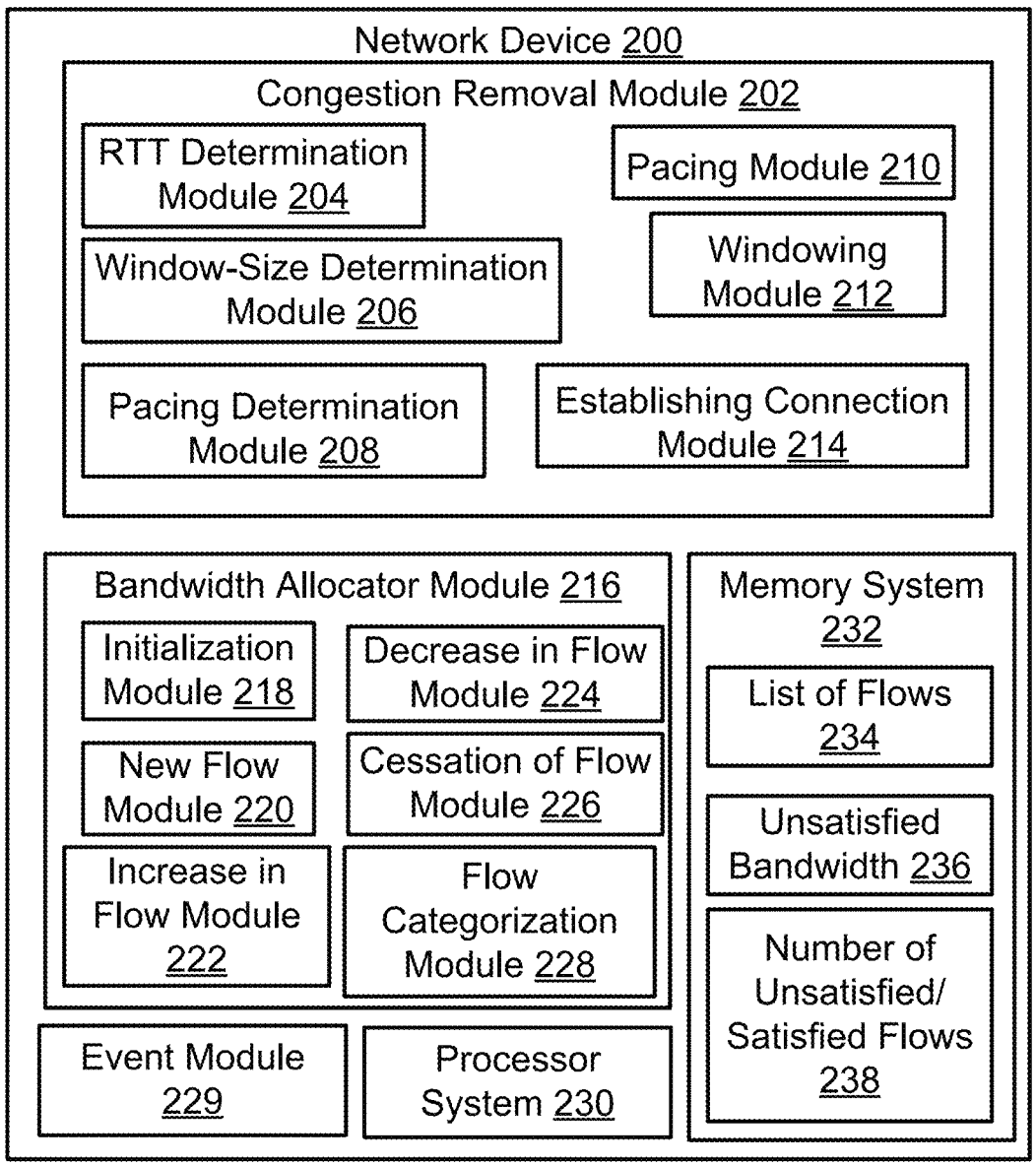
FIG. 2 shows a block diagram of and embodiment of network device.

Network Device 200 (FIG. 2)

FIG. 2 shows a block diagram of an embodiment of network device 200. Network device 200 may include congestion removal module 202 having Round trip Time (RTT) determination 204, window-size determination module 206, pacing determination module 208, pacing module 210, windowing module 212, and establishing connection module 214. Network device 200 may also include bandwidth allocation module 216 having initialization module 218, new flow module 220, increase-in-flow module 222, decrease-in-flow module 224, cessation of flow 226, and flow categorization module 228. Network device 200 may also include event module 229, processor 230, and memory 232, which may store a list of flows 234, unsatisfied bandwidth 236, and satisfied/unsatisfied flows 238. In other embodiments, network device 200 may not necessarily include of the elements listed above and/or may include other components in addition to and/or instead of those listed above.

Network device 200 reduces and/or eliminates bursts and latencies that can be annoying when playing an online game and/or consuming streaming media, such as videos, and songs, for example. Network device 200 may be an embodiment of congestion control module 116$o$, one of routers 112$a$-$n$, congestion control modules 116$a$-$n$ or $p$, or may be a server or user device or incorporated in a server or user device. Network device 200 may be a standalone set box.

Network device 200 may also allocates the bandwidth of a network (e.g., a local network) between different devices within the network (e.g., the local network). Although network device 200 is illustrated as a single device, network device may be a replaced with system of devices. For example, network device 200 may be replaced with distributed system in which the different modules are incorporated into many devices. For example, in an embodiment, network device 200 is a router. In another embodiment, network device 200 is a personal computer, laptop, workstation, or even a server that is part of an edge network for example.

Congestion removal module 202 reduces congestion by reducing the queuing for an individual flow. Congestion removal module 202 reduces congestion that relates to the receipt of messages by edge networks 120$a$-$n$, and would be adequate were there only one flow (e.g., if only one user, device, or process using the edge network and only one edge network is communicating with server 106, congestion removal module 202 may be adequate for removing congestion). Congestion removal module 202 may also ensure that a particular flow (e.g., edge network and/or user device) uses no more bandwidth than congestion control modules 116$a$-$p$ or network device 200 has allocated to that flow.

Round trip Time (RTT) determination 204 determines the round trip time of a message. In this specification, the round trip time of a message is the length of time it takes for a signal to be sent and arrive at a destination plus the length of time it takes for an acknowledgment of that signal to be received or, especially considering that the actual time of transmission (e.g., between delays), the RTT is the sum of time delays of the propagation time of a signal traveling from a first point to a second point and back.

In an embodiment, RTT determination module 204 may initially estimate of the round trip time from the hand shake that establishes the connection between network device 200 and a remote server. To establish the connection, the following sequence of events may be performed. First the initiator of the connection (e.g., network device 200 or the remote server, such as server 106) sends a hello packet. Then, the receiver (e.g., the remote server or network device 200, respectively) sends a response that acknowledges the original hello and the message sent also includes its own hello. The initiator (network device 200 or the remote server) then acknowledges the hello from the responder (the remote server or network device 200). If the initiator (network device 200 or the remote server) is on the edge network (e.g., one of edge networks 120$a$-$n$), the time it takes to get a response may be measured. At the edge network (e.g., one of edge networks 120$a$-$n$), it can be assumed that the time from the router 112$a$-$n$ of the edge network to the sending computer (e.g., server 106) is negligible. So, the round trip time is essentially how long until the edge network (e.g., 120$a$-$n$, as detected by the router—one of routers 112$a$-$n$) receives a response. If the initiator (network device 200 or the remote server—e.g., server 106) is not on the edge network of the router, then the round trip time is approximately the time from sending the response to receiving the acknowledgement of the response or the time between sending and acknowledgement and receiving the next message. In an embodiment, the remote server (e.g. server 106) may measure the round trip time and send the round trip time to network device 200. Optionally, RTT determination module 204 may store the minimum RTT measured, periodically or continually monitor or re-measure the RTT, and update the minimum RTT when then minimum RTT decreases.

Window-size determination module 206 determines the window size that works best to keep the degree to which queuing occurs. The window is the maximum amount of data, a device compliant with TCP (or a similar protocol) will send without receiving an acknowledgement. Windows are typically about 64 Kb or now-a-days may be much more. The window-size determination module 206 may at least initially compute a window size of window=rate*round-trip-time, Where the rate in the above flow is the bandwidth allocated to the flow by bandwidth available to the flow. In other words, rather than continually probing, by increasing the size of the window of the sender and then halving the size of the window at the sender when a packet is dropped, if the window at the sender for the transmitting data is set to window=rate*round-trip-time, queuing and the occurrence of bursts would be reduced.

However, next, the value of the window size, window=rate*round-trip-time, is rounded up to the nearest whole number of maximum messages sizes (in an alternative embodiment, the window is rounded down to the largest number of message lengths that is smaller than the computed window size of window=rate*round-trip-time). It is considered to be good practice for the window to be in multiples of the maximum segment size (mss). The maximum segment size is a parameter of the options field of the TCP header that specifies the largest amount of data, which may be specified in bytes for example, that a computer or communications device can receive in a single TCP segment. In an embodiment, the maximum messages size does not include the TCP segment or the IP header. The IP datagram or message containing a TCP segment may be self-contained within a single packet, or may be reconstructed from several fragmented pieces. To avoid fragmentation of the information, a host may specify the maximum segment size as equal to the largest IP datagram that the host can handle minus the IP header size and TCP header sizes. For many computers, the mss is established by the operating system. Although it is possible to set the window to other sizes, a variety of problems arise when the window is not a multiple of the mss. For example, a common maximum segment size is 1448 bytes.

The window value indicated in the acknowledgement packet is an indication to the sender that the receiver does not want to receive more data than the window value in the acknowledgement packet. To calculate the RTT it may be helpful to be able to match a response packet with a packet sent. So when a packet A (or other messages) is sent, a timer is started (e.g., by recording the time at which packet A is sent). After starting the time, the device sending the packet (or the other message) waits until a response to packet A arrives. Then the sent time may be subtracted from the response time measured by the timer, yielding the round trip time. An aid to the problem of measuring RTT is identifying or matching a response packet with a sent packet. There are at least three possible ways to of matching the response message with the original message sent.

(1) The connection establishment follows the following steps. First a synchronization packet (Sync packet) is sent by a sending device and received by the receiving device. Then a synchronization acknowledgment (Syn-ACK) is sent by the receiving device and received by the sending device. Then, a synchronization acknowledgment (SYN-ACK) is sent by the sending device and received by the receiving device. Meaning that the RTT can be measured (e.g., by comparing the time of receipt of the Sync-ACK and to the time of sending the Sync packet).

(2) In an embodiment using TCP, there is a TCP option that allows a unique identifier (typically a timestamp) that is be echoed by the receiving end, which means that the receiving end sends an acknowledgement that includes the timestamp of the message being acknowledged. With this option available one can match packets and therefore measure RTT.

(3) If the window for receiving an acknowledgement is set to limit the TCP window, as herein. If the window is size 10 and if an acknowledgement is sent acknowledging sequence number 15 with a window size of 10, then only when that packet arrives is sequence number 25 allowed by the TCP protocol to be sent. So when a message with sequence number 25 arrives, the packets can be matched and the RTT can be measured.

Note that if a TCP connection has no data to send, the response to a message may take much longer. Hence, the minimum RTT measured is likely to be closest to the actual RTT.

Furthermore, one nice thing about TCP connections, which are rate limited and therefore do not have inflated RTTs (because rate limited connections do not send data immediately), is that rate limited are not the connections causing the congestion problem, and consequently the RTT of rate limited connections tend not to include delays caused by packets waiting in queues.

Since the round trip time can be calculated (as described further elsewhere in this specification, such as in conjunction with FIGS. 6 and 7, below), such as by RTT determination module 204, and the rate at which it is desired to send packets can be determined, therefore the window can be calculated.

The TCP header includes a sequence number (which may be 32 bits). One can identify the initial sequence number based on the sync flag. Specifically, if the sync flag is set to 1, the sequence number is the initial sequence number. The sequence number of the first data byte and the acknowledged number in the corresponding acknowledgement are then the initial sequence number plus 1 (optionally in other embodiments another increment could be used instead of 1). If the SYN flag is clear (0), then the sequence number is the accumulated sequence number of the first data byte of the current segment/message for the current session. The TCP header includes an acknowledgment number (which may be 32 bits). If the ACK flag is set, then the value of the acknowledgement number is the next sequence number that the sender is expecting. The acknowledgement acknowledges receipt of all prior bytes (if any), even if the prior bytes were received in prior messages. The first acknowledgement sent by each end acknowledges the other end's initial sequence number itself, but does not acknowledge the sending of data, as no data is sent in association with the first acknowledgement number. The TCP header includes a window size (which may be 16 bits long). The size of the receive window may specify the number of window size units (by default, bytes) (beyond the segment identified by the sequence number in the acknowledgment field) that the sender of the current segment is currently willing to receive. The techniques, methods, systems, and devices of this specification could work with a different header format other than the one described above.

Pacing determination module 208 determines the rate at which to send messages.

Pacing module 210 sends messages at the rate determined by pacing module 210.

Windowing module 212 overwrites the value in the TCP acknowledgment to the window size determined by window-size determination module 206.

To elaborate on the usefulness of pacing module 210, unfortunately, the congestion problem is not completely solved by overwriting the windows in the header information to change the window to the desired window, for two reasons. The first reason is the restriction of using the multiples of the maximum segment size means that typically, it is not practical to achieve the exact rate desired. In other words, confining the transmission rate to multiples of the maximum segment size means that the rate will be to too low or too high, respectively, resulting in inefficient use of the available bandwidth or occasional congestion.

Also, the second reason that the congestion problem in not solved by overwriting windows in the header is that the bursts of traffic may still occur, if the packets get caught together. If a burst of traffic occurs, instead of a smooth rate for a short period of time, the send rate would be too high for a period of time, and that period of time having the send rate that is too high is followed by a period of no traffic, which would result in a repetition of a period of time in which a queue accumulates followed by a period of time with no queue. The periods of time in which the queue accumulates messages waiting to be processed, creates a latency, which causes issues for low-latency applications.

The solution to both issues is to pace the acknowledgements, such as by pacing module 210. It may be desirable to send packets or messages at a rate, via pacing module 210, that results in the packets or messages arriving. In other words, as soon as the receiver's window is closed (meaning the sender—e.g., server 106—implementing the TCP algorithm will not send anymore messages) an acknowledgement arrives, the protocol allows the sender to send another packet. As a result of receiving an acknowledgement, just after the receiver's window closes (the acknowledgement causes the TCP algorithm to allow the sender to send another message), the sender never needs to wait to send a packet and the sender never sends too many packets. If the receiver's window is larger, so the window is still open when the acknowledgement arrives at the sender's system, the sender may be sent excess packets.

As an aside, although methods discussed in this specification limit the flow of messages in one direction, to limit the flow bidirectionally, two copies of the algorithm may be run—one copy for each direction.

As an aside, the receiver's window is determined to be minimum of the sender's window size and the receiver's window size. The sizes of the windows are the amount of buffering for accepting messages (without receiving an acknowledgement). So that the sender "knows" (e.g., so that sender has a value for) the receiver's window, the receiver's window is sent in the acknowledgement packet and the window in the acknowledgment packet is the window that is overwritten. The sender's window is typically much bigger than the receiver's window (the receiver's window is over-written by the router, because operating systems do not react well to having their local buffer to be the network speed limiter).

To reduce the rate of a remote flow, windowing module 212, based on the window determined by window determination module, overwrites the header of the acknowledgement packet with a desired window (where the desired window is the rate multiplied by the round trip time, as given in the formula above which is rounded up—or in an alternative embodiment rounded down—to an integral number of minimum message sizes).

Since the duration of the window is rounded up, the rate at which messages are received is slightly too high, and so to compensate, acknowledgement packets are not forwarded at the rate the packets arrive at the receiver. Instead, the acknowledgment packets are clocked and sent out at the pace the acknowledgements are supposed to be sent out were the window the size desired. The acknowledgement messages need to be sent within the maximum segment size (mss). The window is split into n segments of the size mms, and so the number of segments n in to which the window is divided is given by $n$=window/MSS.

A segment is sent at every interval of time of duration, $\Delta$=RTT/$n$ (where RTT is the round trip time), so that the entire message is received during the round trip time. Plugging in the expression for n from, above gives, $\Delta$=RTT/(window/MSS)

Plugging in, window=RTT*rate, for the value of the window in the above formula, yields the formula, $\Delta$=mss/Rate, meaning that the acknowledgements are sent out after the interval of time, $\Delta$. The reason why the interval of time $\Delta$ works is that when using the TCP protocol, the acknowledgements move the window to the right meaning more messages can be sent. If the window moves to the right at the exact speed as the sending rate, the sending rate will be identical to the speed of the acknowledgements and bursts will not be allowed.

As background, when (using TCP) an acknowledgement is received for a particular message (e.g., a particular packet or segment of a packet), all prior packets (or segments of packets) are assumed to have been received, because following the TCP, the receiver will not send an acknowledgement for a message with a higher number, if a message with a lower number has not been received. Thus, for example, if the receiver receives messages 1, 2, 3, and 5, but has not received message 4, assuming that the receiver ordinarily sends an acknowledgement after every three messages, upon receiving message 3, an acknowledgment of receiving message 3 may be sent. Then when message 5 is received (without receiving message 4), the receiver may resend the acknowledgement for message 3 as an indication to the sender that a message after message 3 was dropped.

As another example, to provide more background, if the receiver ordinarily sends an acknowledgement after every 3 messages, after the sender receives message 3, the window will be reset to start after the receipt of the acknowledgement of message 3. Then, after the receipt of the acknowledgement of message 6, the sender will reset the window to start after the receipt of the acknowledgement of message 6. Thus, with the receipt of each acknowledgement of a new message, the window is shifted forwards in time (that is, on a graph that has the time axis running from left to right, with the earlier times to the left and the later times to the right the window can be said to be shifted to the right).

As an example, if the mss is 1448 Kbytes, and the quickest that the bottle necked connection can handle is 1.5 mbit per second, then mss/Rate is A=mss/Rate~23 milliseconds. In other words, it is desirable to send one packet every 23 milliseconds. In contrast, assume that the round trip time for a packet is just 5 milliseconds. Then, were it not for the limitation of it being desirable to set the window to a multiple of mss (which in this example is 1448 Kbytes) a window of 12,500 Kbytes might have been able to work if the window did not need to by a multiple of mss, which would allow A to be set to just 5 milliseconds and would allow for faster communications. Since, as soon as the echo (the acknowledgement sent by the receiver) arrives at the sender's system, a new message is sent, thereby controlling the rate of the flow of packets, pacing the rate at which acknowledgements are sent controls the rate at which the sender sends the messages, via pacing module 210.

However, to keep the window a multiple of the mss, A is chosen to be the larger size, which in this case, the desired-window/mss rounded up=12500 Kbytes/1448 Kbytes which equals 8.6 mss~9 mss (rounding up 8.6 to 9), and so the window would be chosen to be 9 mss (or 9*1448 Kbytes=13032 Kbytes), and the packets are sent every 23 milliseconds and so the window is shifted to the right every 23 milliseconds (or in an alternative embodiment the desired window may be rounded down).

Establishing connection module 214 establishes a connection with a remote server. Establishing connection module 214 may perform a handshake with server 102 and/or 106, which may involve each party sending the other a message and receiving an acknowledgement. If the connection is a secure communication, the establishing of the connection may also include each party sending the other an encryption key, an acknowledgement of receiving the encryption key that was sent. In this specification, the connection is established after a single packet is seen in both directions, that is, after the connection handshake. After the connection handshake, control is taken over the size of the window, and the overwriting the window starts and continues from then onwards.

Bandwidth allocation module 216 allocates bandwidth between multiple users that together require more bandwidth than is available. Congestion removal module 202 handles an individual flow being controlled (and may be applied to multiple flows individually), and sets the flow to the bandwidth or rate assigned the flow. However, traffic that is made up of only a single flow is unrealistic. It may be desirable to have an algorithm that decides the rate to be allocated to each flow. Congestion removal module 202 may be referred to as enforcer, and controls the bandwidth allocated to each flow individually, ensures that the flow is allocated to the bandwidth determined by bandwidth allocation module 216. Bandwidth allocation module 216 may implement the allocation of bandwidth incremental, and may therefore adjust the allocation of bandwidth in response to a change in flow, without immediately performing all of the computations and adjustments that need to occur to keep a desired allocation of bandwidth, but incrementally adjusts the allocation of bandwidth so as to cause the bandwidth to incrementally approach a desired allocation.

A goal, that may be desirable for an allocation algorithm, may be to maximize the use of the bandwidth available in a fair manner, so that each flow has equal access to the bandwidth available. For example, bandwidth allocation module 216 may set the average bandwidth allocated to each unsatisfied flow to be a value that is a maximum average bandwidth obtainable, while allocating an equal amount of bandwidth to each unsatisfied flow, allocating no more bandwidth to each satisfied flow than required to allocate to keep satisfied flows satisfied, while keeping a maximum bandwidth allocated to any satisfied flow to be less than the average bandwidth allocated to unsatisfied flows. Thus, the result of applying bandwidth allocation module 216 is the same as if all flows are unsatisfied each flow is allocated the same bandwidth, whereas if allocating an equal amount of bandwidth to all flows were to result in some flows being allocated extra bandwidth, the extra bandwidth is evenly distributed between the unsatisfied flows. If that again would result in some flows being satisfied, the excess bandwidth is again evenly distributed between all flows, until all the bandwidth is used up, and the sum of the bandwidth allocated to all satisfied flows is just the sum of the bandwidth required by all satisfied flows, while each unsatisfied flow is allocated the same amount of bandwidth, which is more than the bandwidth allocated to any individual satisfied flow.

Both the enforcer, congestion removal module 202 and band bandwidth allocator 216 the may reside on the router of a third party (instead of on the router of the sender or receiver), as long as the third party intercepts communications between the sender and the receiver, or more specifically intercepts the acknowledgements sent by the receiver to sender and sends to the sender a modified acknowledgement having the appropriate information to cause the sender to send the messages at a rate that will reduce and/or eliminate bursts and queuing, by having the desired window size and the desired rate at which messages are sent. For example, a user (the receiver) may be playing a game on a game server (the sender). The receiver's acknowledgements may be sent to, or intercepted by, the third party, and the third party may be in a different geographic location than the sender and a different geographic location than the receiver. The third party may send acknowledgements to the sender that are labeled as acknowledgements from the receiver. For example, a game server (or sender) may be given no indication that the acknowledgements are not coming from the receiver (the user playing the game), and consequently the sender may "think" the acknowledgements are coming from the receiver, even although the acknowledgements received by the sender are actually being sent to the sender by a third party to the sender. Alternatively, the software to modify the behaviour of the sending machine could reside on the system of the receiver.

Band bandwidth allocator 216 maximizes the share allocated to entities requesting the least resources. In an embodiment of band bandwidth allocator 216, the entities are TCP flows and the resource is the total bandwidth of the connection. In an embodiment, band bandwidth allocator 216 has two types of flows, which are satisfied flows and unsatisfied flows. Unsatisfied flows require more than their fair share of the available bandwidth.

The rate in the formula window=rate*RTT and the formula Δ=mms/rate, used by window-size determination module 206 and windowing module 212 and pacing determination module 208, pacing module 210 is the bandwidth allocated to the flow by bandwidth allocation module 216. For example, if the router has a capacity of 18 Mbits/sec, and there are 6 user devices, which have each been allocated $\frac{1}{6}^{th}$ of the bandwidth, then the rate for each user device is 3 Mbits/second. Bandwidth allocation module 216 reduces the latency issues that are caused by multiple flows. Bandwidth allocation module 216 allocates bandwidth in a manner such that satisfied flows are allocated less than or the same amount of bandwidth as allocated to the average unsatisfied flow. In an embodiment, all unsatisfied flows are allocated the same bandwidth, which is the average bandwidth allocated to the unsatisfied bandwidth (in an alternative embodiment some unsatisfied flows may be allocated more bandwidth than other unsatisfied flow based on the relative importance of the particular flow and/or other criteria). In other words, optionally, the amount of flow allocated to the each unsatisfied flow, by bandwidth allocation module 216, is the total bandwidth allocated to unsatisfied flows divided by the number of unsatisfied flows. Additionally, bandwidth allocation module 216 ensures that the total bandwidth allocated tends to be the same, usually is the same, or is always the same as the total bandwidth available. When bandwidth allocation module 216 changes a flow from being satisfied to being unsatisfied, the bandwidth previous allocated to the flow is added to the unsatisfied flows and subtracted from the bandwidth allocated to satisfied flows. Similarly, when a flow is changed from an unsatisfied flow to a satisfied flow, the bandwidth required for satisfying the flow is subtracted from the bandwidth previously allocated to the unsatisfied flow and added to the total bandwidth allocated to the satisfied flows, by bandwidth allocation module 216. Specifically, before increasing the flow to a previously satisfied flow (to keep the flow satisfied), bandwidth allocation module 216 determines whether the increase in flow will cause the satisfied flow to be allocated more bandwidth than the average bandwidth allocated to unsatisfied bandwidth. If the increase in flow will cause the satisfied flow to be allocated more bandwidth than the average bandwidth allocated to unsatisfied bandwidth, then the flow is optionally recategorized as an unsatisfied flows and is treated as an unsatisfied flow.

Initialization module 218 handles the startup of bandwidth allocation module 216. Initialization module 218 initially allocates all of the flows as unsatisfied and allocates of the bandwidth to unsatisfied flows. Then (e.g., at a later time), each flow is checked by initialization module 218 to see whether the flow needed to satisfy that flow is less than the average flow allocated to unsatisfied flows. If the flow needed to satisfy a flow is less than the average flow allocated to unsatisfied flows, then the flow is treated as (and optionally categorized as) a satisfied flow, by initialization module 218, and initialization module 218 decreases the bandwidth allocated to unsatisfied flows and increases the flow allocated to satisfied flows by the amount of bandwidth needed by flow that is now newly satisfied.

New flow module 220 handles the introduction of a new flow (e.g., a user newly connect a device to one of edge network 120*a-n*). New flow module 220 initially designates the new flow as an unsatisfied flow and causes the new flow to be treated as an unsatisfied flow. Optionally, the new flow is then checked by new flow module 220 to see whether the new flow requires less bandwidth than the average bandwidth allocated to unsatisfied flows.

Increase-in-flow module 222 handles situations in which a device newly requires more bandwidth. If the flow (that requires more bandwidth) is already an unsatisfied flow, there is nothing for increase-in-flow module 222 to do—the flow remains an unsatisfied flow. If the flow (that requires more bandwidth) is a satisfied flow, increase-in-flow module 222, determines whether the flow newly required by a satisfied flow can be accommodated without causing the flow to be allocated more bandwidth than the average unsatisfied flow will be allocated after taking the bandwidth from the bandwidth allocated to unsatisfied flow needed to keep the previously satisfied flow satisfied. If the flow newly required by a satisfied flow can be accommodated without causing the flow to be allocated more bandwidth than the average unsatisfied flow, the bandwidth will be allocated after taking the needed bandwidth from the bandwidth allocated to the unsatisfied flows (needed to keep the previously satisfied flow satisfied), increase-in-flow module 222 allocates the required bandwidth to the satisfied flow, taking the required bandwidth from the unsatisfied bandwidth. Otherwise, if the flow newly required by a satisfied flow cannot be accommodated without causing the flow to be allocated more bandwidth than the average unsatisfied flow will be allocated after taking the bandwidth from the bandwidth allocated to unsatisfied flow needed to keep the previously satisfied flow satisfied, increase-in-flow module 222 causes the flow to be treated as an unsatisfied flow and the bandwidth previously allocated to the satisfied flow is allocated to the unsatisfied bandwidth.

Decrease-in-flow module 224 handles situations in which a flow no longer needs as much bandwidth. If the flow is an unsatisfied flow, decrease-in-flow module 224 checks whether the flow can be treated as a satisfied flow. If the flow requires less bandwidth than the average bandwidth allocated to unsatisfied flows, then decrease-in-flow module 224 treats the flow as a satisfied flow, and removes the bandwidth required to satisfy the flow from the bandwidth allocated to unsatisfied flows and allocates that flow to the satisfied flows. Note that the result is that the average flow allocated to the unsatisfied flows increases or remains unchanged, because the flow needed to satisfy the newly satisfied bandwidth is less than or equally to the average bandwidth allocated to unsatisfied bandwidth. If the flow is a satisfied flow, decrease-in-flow module 224 reallocates the now unneeded flow from the satisfied flow to the unsatisfied flows.

Cessation of flow 226 handles situations in which a flow stops. For example, a user shuts off their user device or disconnects from one edges networks 120*a-n*. If the flow that stops was a satisfied flow, the bandwidth previously allocated to the flow is reallocated by Cessation of flow 226 to the unsatisfied flows, which may cause one or more unsatisfied flows to become satisfied flows. If the flow was an unsatisfied flow, the amount of flow allocated to the unsatisfied flows does not change, but the number of unsatisfied flows, decreases, so that more flow may be allocated, by cessation of flow 226 to each individual unsatisfied flow.

Flow categorization module 228 determines whether a flow should be treated as a satisfied flow or an unsatisfied flow and optionally recategorizes the flow when flow categorization module 228 determines that the manner in which a flow is treated should be changed from satisfied to unsatisfied or from unsatisfied to satisfied. Initialization module 218, new flow module 220, increase-in-flow module 222, decrease-in-flow module 224, cessation of flow 226 may call flow categorization module 228 to determine whether to change the manner in which a flow is treated.

Flow categorization module 228 may be invoked anytime the bandwidth allocated to unsatisfied flows changes. When the average bandwidth allocated to unsatisfied flows increases, the unsatisfied flows may be checked by flow categorization module 228 to see whether there are any flows that are currently treated as unsatisfied, but that require less bandwidth than the average bandwidth allocated to unsatisfied flows, and any flows that are currently treated as unsatisfied, but that require less bandwidth than the average bandwidth allocated to unsatisfied flows may be reclassified by flow categorization module 228 as satisfied. When the average bandwidth allocated to unsatisfied flows decrease, the satisfied flows may be checked by flow categorization module 228 to see whether there are any flows that are currently treated as satisfied, but that require more bandwidth than the average bandwidth allocated to unsatisfied flows, and any flows that are currently treated as satisfied, but that require more bandwidth than the average bandwidth allocated to unsatisfied flows may be reclassified by flow categorization module 228 as unsatisfied.

Flow categorization module 228 checks whether a flow is greater or less than the average flow allocated to unsatisfied flows. If a flow is greater than the average flow allocated to unsatisfied flow, flow categorization module 228 causes the flow to be treated an unsatisfied. If a flow is less than or equal to the average flow allocated to unsatisfied flow, flow categorization module 228 categorizes the flow and/or causes the flow to be treated as a satisfied flow.

However, if a satisfied flow increase its need for bandwidth, if the flow newly required by a satisfied flow can be accommodated without causing the flow to be allocated more bandwidth than the average unsatisfied flow will be allocated after taking the bandwidth from the bandwidth allocated to unsatisfied flow needed to keep the previously satisfied flow satisfied, flow categorization module 228 allocates the required bandwidth to the satisfied flow, taking the required bandwidth from the bandwidth allocated to unsatisfied flows. Otherwise, if the flow newly required by a satisfied flow cannot be accommodated without causing the flow to be allocated more bandwidth than the average unsatisfied flow will be allocated after taking the bandwidth from the bandwidth allocated to unsatisfied flow needed to keep the previously satisfied flow satisfied, flow categorization module 228 causes the flow to be treated as an unsatisfied flow and the bandwidth allocated to the previously satisfied flow to be allocated to the unsatisfied flows.

Optionally, flow categorization module 228 may implement an algorithm to first determine an ideal amount of bandwidth to allocate to the unsatisfied bandwidths and which flows to categorize as unsatisfied, and then after the computation is performed by flow categorization module 228, the flows may be categorized, by flow categorization module 228, as satisfied and unsatisfied according to whether the bandwidth required by the flow is less than the average bandwidth that is allocated to unsatisfied flows, allocating bandwidth not allocated to any satisfied flows to unsatisfied flows.

In an embodiment, although the computations $U_c/|U|$, how much to bandwidth to allocate to the unsatisfied flows, and to satisfied flows is based on the current values of the satisfied flows, all flows, including satisfied flows, are only limited in bandwidth by bandwidth allocator 216 from receiving more than $U_c/|U|$ of bandwidth, and thus a flow assumed to require less than $U_c/|U|$ may not actually be limited bandwidth allocator 216 from using a bandwidth that is greater than the flow assumed (up to a bandwidth of $U_c/|U|$). In other words, optionally, if a satisfied flow temporarily needs more bandwidth than previously measured, the satisfied flow may be allowed by to receive up to $U_c/|U|$. Although while this flow needs the higher amount of bandwidth, the value of $U_c/|U|$ may be too high, the value of $U_c/|U|$ and the amount of bandwidth that is allocated for unsatisfied flows is not adjusted until the next event in which flows are measured. However, the combination of the value of the rate (tracked by congestion removal module 202), $U_c$, and U (tracked by bandwidth allocator 216) are based on the measured values of the flows, and the values used for the rate, $U_c$, and U, tends to enforce the allocation of bandwidth to the flows.

Optionally, event module 229 detects when an event occurs that require action in order to maintain a desired type of allocation of bandwidth, such as reallocating bandwidth and/or changing a flow from being treated as satisfied or unsatisfied. Events module 229 may detect changes in bandwidth required by different flows by periodically measuring the bandwidth required by different flows, and consequently event module 229, may automatically and periodically measure the bandwidth required by all flows or all flows expected to require less than a threshold value of bandwidth. Then the bandwidth currently required by each flow may be compared to the bandwidth previously required, thereby detecting any changes in the bandwidth required (any events). Events may be detected in other ways.

An event may be the addition of a new flow, the cessation of a flow, a change in the bandwidth required by a flow, and/or optionally the change in the average bandwidth allocated to unsatisfied flows or the total bandwidth allocated to all unsatisfied flows. Event module 229 may be part of bandwidth allocation module 216 and/or called by bandwidth allocation module 216. Event module 229 may determine when to implement initialization module 218, new flow module 220, increase-in-flow module 222, decrease-in-flow module 224, cessation of flow 226, and flow categorization module 228. For example, if bandwidth allocation module 216 was just turned on or the system as a whole is just turned on, event module 229 causes initialization module 218 to be implemented. If event module 229 detects a new flow, event module 229 causes new flow module 220 to be implemented. If event module 229 detects an increase in bandwidth required by a flow, event module 229 causes increase-in-flow module 222 to be implemented. If event module 229 detects a decrease in bandwidth required by a flow, event module 229 causes decrease-in-flow module 224 to be implemented. If event module 229 detects a change in the average bandwidth per unsatisfied flow or a change in total bandwidth allocated to unsatisfied flows, event module 229 may cause flow categorization module 228 to be implemented to determine whether there are any flows that are currently allocated more bandwidth than needed, as a result of being classified as unsatisfied, but requiring less bandwidth than the average bandwidth allocated for unsatisfied flows. Also, if event module 229 detects a change in the average bandwidth per unsatisfied flow or a change in total bandwidth allocated to unsatisfied flows, event module 229 may cause flow categorization module 228 to be implemented to determine whether there are any flows that are currently categorized as satisfied, but that require more bandwidth than the average bandwidth allocated for unsatisfied flows.

Processor 230 may in include hardware modules that perform and/or are programed to perform any of the algorithms performed congestion removal module 202, Round trip Time (RTT) determination 204, window-size determination module 206, pacing determination module 208, pacing module 210, windowing module 212, establishing connection module 214, bandwidth allocation module 216, initialization module 218, new flow module 220, increase-in-flow module 222, decrease-in-flow module 224, cessation of flow 226, and flow categorization module 228. Memory 232 may store machine instructions for implementing any of the algorithms performed by processor 230, such as algorithms for implementing congestion removal module 202, Round trip Time (RTT) determination 204, window-size determination module 206, pacing determination module 208, pacing module 210, windowing module 212, establishing connection module 214, bandwidth allocation module 216, initialization module 218, new flow module 220, increase-in-flow module 222, decrease-in-flow module 224, cessation of flow 226, flow categorization module 228, event module 229.

Memory 232 stores machine instructions that processor 230 implements and/or data required for the methods implemented by system 100. For example, list of flows 234 may store a list of current flows in which the flows are ordered according to the amount of bandwidth required. List of flows 234 may be updated whenever the bandwidth required by a flow changes, a new flow is added or a flow ceases, which may initially be created and/or updated by event module 229 upon measuring the flows. By storing the flows in the order of bandwidth required, determining which flows should be satisfied and which flows should be unsatisfied may be simplified to finding the flow with the largest bandwidth requirement that should be satisfied. Unsatisfied bandwidth 236 stores the amount of bandwidth allocated to unsatisfied bandwidth and/or satisfied bandwidth.

Satisfied/unsatisfied flows 238 is optional and may store which flows are satisfied and which flows or unsatisfied.

Benefits of Slowing Down the Rate that Each Source Sends the Packets

There are a few benefits gained by slowing down the rate that the packets are sent to the home network, which are as follows. Minimizing the amount of data being queued minimizes the latency for real-time and interactive applications. In an embodiment, the algorithm that is implemented has an optimum fairness determination. In other words, the Internet is shared more efficiently. Specifically, when packets are dropped (due to the queue being full or due to premature dropping of packets performed by some algorithms), then Transmission Control Protocol (TCP) resends the dropped packets. When packets are re-sent, data that has already been sent is retransmitted and therefore sent a second time, thereby using up twice the bandwidth that the data would have required had the data only been sent once. Consequently, the line the ISP rents is not being used optimally (as the resending of the dropped data uses more bandwidth than the data requires as compared to had the data only been sent once). On a macroscopic scale, since all customers have fewer dropped packets and since therefore there are fewer packets that need to be re-sent, the cost to the ISP for renting data lines is reduced (the data lines are often called "transit lines" or "peer lines"). Also, an embodiment of the algorithm disclosed in this specification minimizes or at least reduces the likelihood of bursts. On a macro scale, minimizing bursts means that the maximum transmission needed for all customers combined can be reduced. Specifically, during a burst, data is sent too quickly, requiring higher capacity lines than were the data sent at a steady rate or requiring queues to store the bursts of packets, which would cause spikes in the latency. The unnecessary extra speed means that the ISP needs to rent higher capacity lines to handle the bursts.

Figure 3:
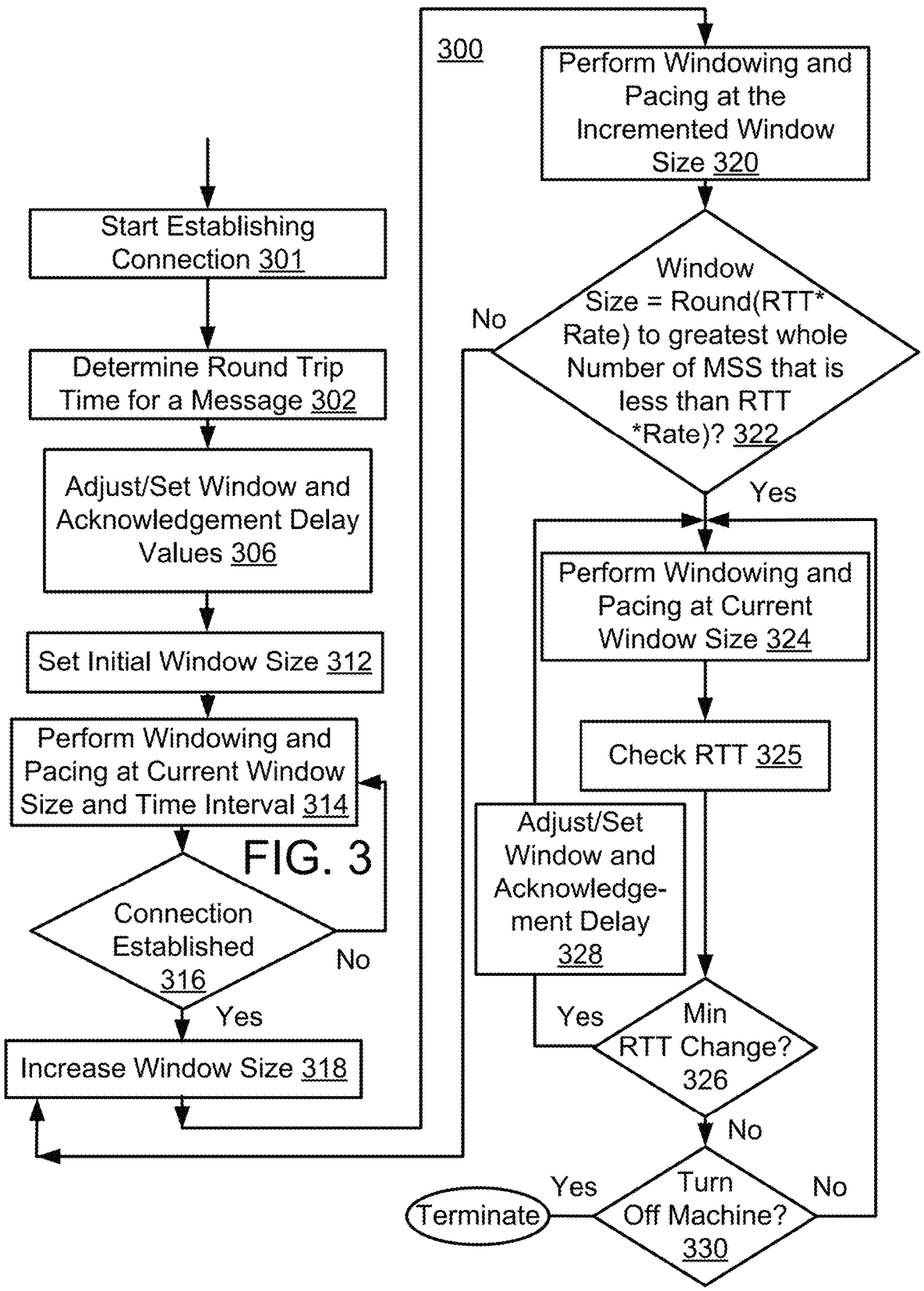
FIG. 3 illustrates a flowchart of an embodiment of a method of implementing congestion control module, which may be used in the embodiment of FIG. 2.

FIG. 3 Method Implemented by Congestion Control Module 202

FIG. 3 illustrates a flowchart of an embodiment of a method 300 of implementing congestion control module 202. Method 300 may be implemented by RTT determination module 204.

In step 301, establishing connection module 214 starts establishing a connection. In step 302, RTT determination module 204 initially estimate of the round trip time from the hand shake that establishes the connection between network device 200 and a remote server 102 and/or between one of routers 112a-n and user devices 118a-n.

In step 302, to establish the connection, RTT determination module 204 may cause a hello message to be sent then wait for a response. The round trip time is essentially how long until the edge network (e.g., as detected by the router) receives a response (e.g., how much time passes between sending an acknowledgement and receiving the next message). If the initiator (e.g., network device 200) is not on the edge network of the router, then the round trip time is approximately the time from sending the response to receiving the acknowledgement of the response. The messages used for setting the initial RTT may be the same messages that make up the handshake of establishing the connection (e.g., the exchange of hello messages and the exchange of acknowledgement messages acknowledging receiving the other party's hello message).

In step 310, a message is received at network device 200. In step 312, the initial window size is set by windowing module 212, by overwriting the window size in the acknowledgement header with a window size that is significantly smaller than that computed in step 304. The initial window size may be maintained until the connection is established and the sender's window is increased to an appropriate size. For example, the initial windows size may be the same size as one maximum message size.

In step 314, the windowing and pacing is performed, by windowing module 212 and pacing module 210. The pacing module 210 causes the sending of acknowledgments to be delayed by the duration of time of Δ=mss/rate, and windowing module 212 overwrites the window of the header, to window=RTT*rate, rounded up (or in an alternative embodiment is rounded down) to the nearest whole number of maximum message sizes. To elaborate further, while the connection is being started, the window grows exponentially which allows for major bursts, and consequently, the window growth at startup is an opportunity for bursty traffic, because the window is opened wider allowing more packets to pass, and the sender can transmit at higher speeds. To reduce the likelihood of bursty traffic, in an embodiment, while the connection is being established, the receiver window is made very small by windowing module 212. Then, the window is caused to grow, by windowing module 212, after the connection is established, but while being limited by the acknowledgement pacing of pacing module 210. So that the traffic is always window limited from the creation of the connection. If the window growth function is controlled, by implementing acknowledgement-pacing (that is by sending an acknowledgement after every A), then the window itself is controlled, a remote TCP flow can be controlled, and bursting can be eliminated.

In step 316, a determination is made of whether the connection is established. If the connection is not established, method 300 returns to step 314. If in step 316, it is determined that the connection is established, method 300 proceeds to step 318.

In step 318, windowing module 212 increments the window size. In step 320, windowing module 212 and pacing module 210 perform the windowing and pacing based on the incremented window. In step 322, a determination is made whether the window size is the same as computed in step 304. If the window size is not yet the size specified in step 304, the method returns to step 318, and the window size is incremented again. In step 322, if it is determined that the window size is the size specified by step 304 (window=RTT*rate, rounded up—or in another embodiment rounded down—to the nearest number of maximum message sizes), the method continues to step 324. Steps 320 and 322 are optional. For example, in an alternative embodiment, in step 318, the window size could be increased immediately to the size specified in step 304.

In step 324, the windowing and pacing are performed using the rate determined by step 304. In method 300, in each of steps 314, 320, and 324, the windowing and pacing includes (1) receiving a message, (2) overwriting the window size in the acknowledgement header to the desired window size, via windowing module 212, and (3) delaying the sending of the message until the period of time Δ=mss/rate before sending the next message and then sending the message without further delay, via pacing module 210.

In step 325, the RTT is checked by RTT determination module 204. In step 326, a determination is made as to whether the value stored as the minimum RTT is correct. It may be that because of queuing the value stored as the minimum RTT was too large. Alternatively, there may have been a reconfiguration of the nodes of the network that may cause the minimum RTT to increase or to decrease. If the minimum RTT is incorrect, method 300 proceeds to step 328. In step 328, the window size and the duration of the delay before sending an acknowledgement is determined by window-size determination module 208 and pacing determination module 206, respectively. After step 328, method 300 proceeds to step 324. Returning to step 326, if the minimum RTT has not changed, method 300 proceeds to step 330. If the machine is shut off or application that includes congestion removal module 202 is shutoff, the method ends. Otherwise, the method 300 returns to step 324.

Figure 4:
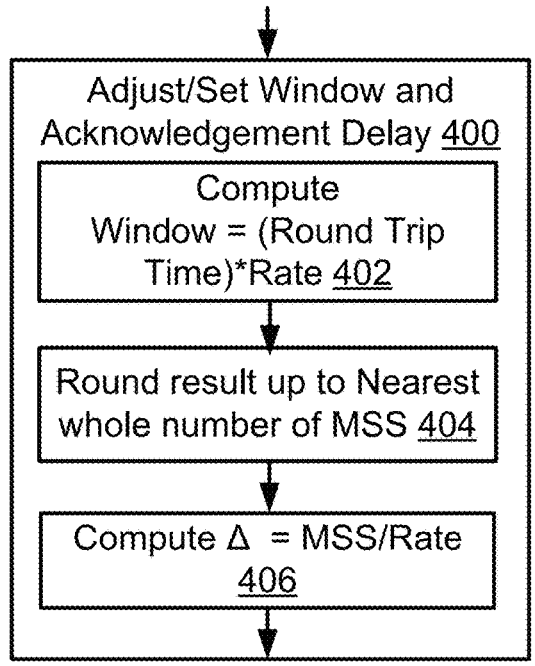
FIG. 4 shows a flowchart of an embodiment of a method for setting the pacing and windowing parameters.

FIG. 4 shows a flowchart of an embodiment of a method 400 for setting the pacing and windowing parameters. Method 400 may be an embodiment of step 306 and/326 of method 300.

In step 402, the window is computed, by window-size determination module 206, based on the RTT determined, (e.g., according to the equation window=RTT*rate). In step 404, the results of the computation of step 304 is rounded down, by window-size determination module 206, to a whole number of maximum messages sizes. In step 406, the interval at which acknowledgements are sent is set to Δ=mss/rate, where mss is the maximum message size is computed by pacing determination module 206.

Figure 5:
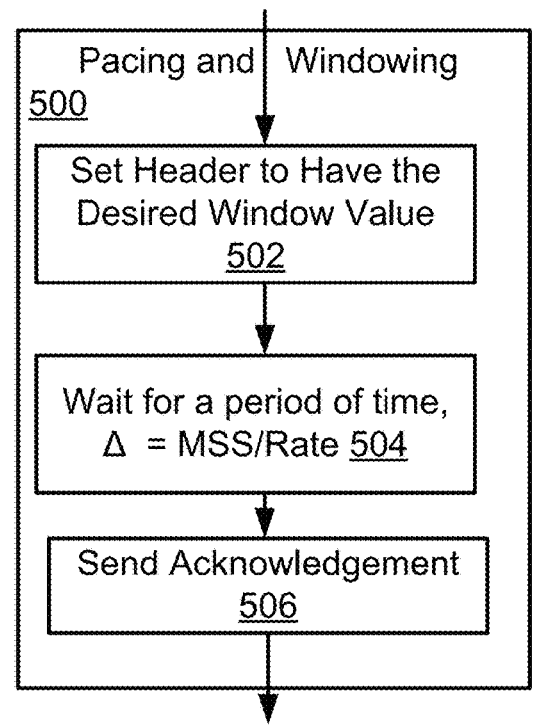
FIG. 5 shows a flowchart of an embodiment of a method of performing the windowing and pacing.

FIG. 5 shows a flowchart of an embodiment of a method 500 of performing the windowing and pacing. Method 500 may be an embodiment of steps 314, 320, and 324 of FIG. 3. In step 502, the header of an acknowledgement message is overwritten by windowing module 212 to a desired window size. For step 320, the window size may be just one maximum message size. For step 320, the window size may be incremented by one maximum message size each time step 320 is performed, until the window size becomes window=rate*RTT rounded up to the nearest number of whole mss (in an alternative embodiment window=RoundDown(rate*RTT/mss)*mss, where RoundDown( ) is a function that rounds down the nearest integer, which is the largest number of maximum message sizes that is smaller than RTT*rate). In step 504, a duration of time Δ=mss/rate is waited by pacing module 210. In step 506, the acknowledgement is sent by congestion control module 202.

Figure 6:
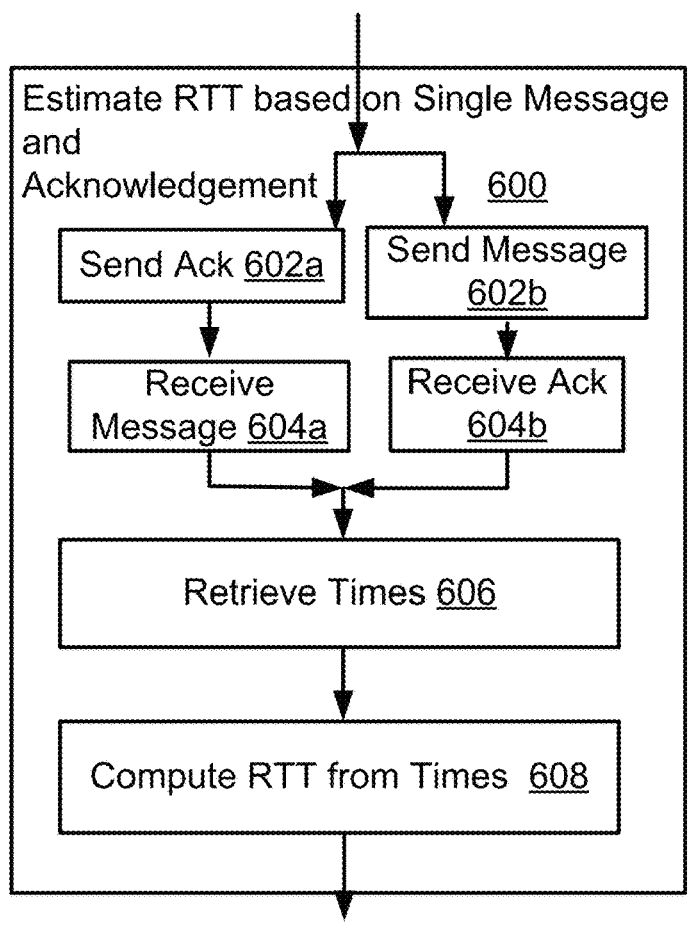
FIG. 6 shows a flowchart of an embodiment of method of estimating the RTT.

FIG. 6 shows a flowchart of an embodiment of method 600 of estimating the RTT. Method 600 may be an embodiment of steps 302 and/or 305 (FIG. 3). In step 602a, an acknowledgement is sent and the time that the acknowledgement is sent is recorded, so that the time can be compared to the time of receipt of the next message that arrives (e.g., the timestamp is recorded. Then when a packet with sequence number that is greater than or equal to the original acknowledgement+window size arrives, the current time is subtracted from the previously measured timestamp to calculate the RTT).

Alternatively, in step 602b a message is sent to the server, and the time that the message is sent is stored in memory 232.

In step 604a, a message is received that has a sequence number that of the message just after the one to which the acknowledgement was sent, and the time of arrival is determined by the arrival. Alternatively, in step 604b, the acknowledgement to the message sent is received, and the time of arrival is determined.

In step 606, the round trip time is determined from the difference between the sending of the acknowledgement and the receipt of the message with the next sequence number after that of the message of the acknowledgement.

To elaborate further, at the receiving end, since in the algorithm, the window size is limited from the start of the algorithm, in an embodiment the sender (e.g., the server 102, 106, or any of routers 112a-n) should be waiting for every acknowledgement before sending the next message (one of the purposes of an embodiment of the algorithm is to limit the sender by causing the sender to wait for acknowledgements from the receiver of the last message sent, by delaying or pacing the sending of the acknowledgements). So after an acknowledgement is sent by the receiver at the edge network (e.g., via any of routers 112a-n), since the sender (e.g., the server) waits to receive another the acknowledgement before sending the next packet, and since the number of packets that can be sent by the sender (e.g., the server 106) is limited by the window size, therefore when the next packet arrives, the receiver can check the packet number and the window size of the sender (as indicated by the packet header, for example) to determine if the packet received is the first packet received that could be sent according TCP protocol after the acknowledgement. It is assumed that the time between the sending of all messages that can be sent, according to the protocol (e.g., TCP), during a window is negligible and therefore can be ignored. Consequently, the time between sending the acknowledgement and receiving the next message that could be, according to the protocol, sent (even if that packet arrives out of order) should be close to the round trip time. Although if the server has a delay between receiving an acknowledgement and sending the next message, that would increase the round trip time measured, presumably the sorts of nodes that an edge network would limit how quickly the node sends packets (by delaying the sending of acknowledgements) are nodes that typically send essentially as much data as possible as soon possible, and consequently it can be assumed that the delay between the node receiving the acknowledgement and sending the next packet is typically negligible. An acknowledgement includes the sequence number of the message that the acknowledgement is acknowledging and the window size. Therefore, when an acknowledgement is received, the sender is now allowed by the protocol to send the message that has sequence number.

$$\text{Ack Number+Window Size/mss,}$$

where Ack Number is the sequence number of the segment that is being acknowledged. In other words, the segment with the sequence number Ack Number+Window Size is only allowed to be sent when that acknowledgement arrives. So, measuring the time from the acknowledgement being sent to receiving the segment with a sequence number of Ack Number+Window Size/mss (where in general the units of the window size is in bytes although other units such as bits could be used, and window size is a multiple of maximum message sizes that fit within the window) gives the RTT, where the sequence number should have a value greater than Ack Number and less than or equal to Ack Number+Window Size/mss. Stated differently, the Seq. No. satisfies, Ack Number<Seq. No.≤Ack Number+Window Size/mss. Since the server sends all of the messages it can upon receiving the acknowledgement, if there is more than one message sent, it does not matter which one is used to measure the round trip time, since the messages sent were all sent at essentially the same time. Additionally, as a result of pacing, the acknowledgements and setting the window size, there will typically only be one message sent with a Sequence Number that satisfies, Ack Number<Seq. No.≤Ack Number+Window Size/mss.

Figure 7:
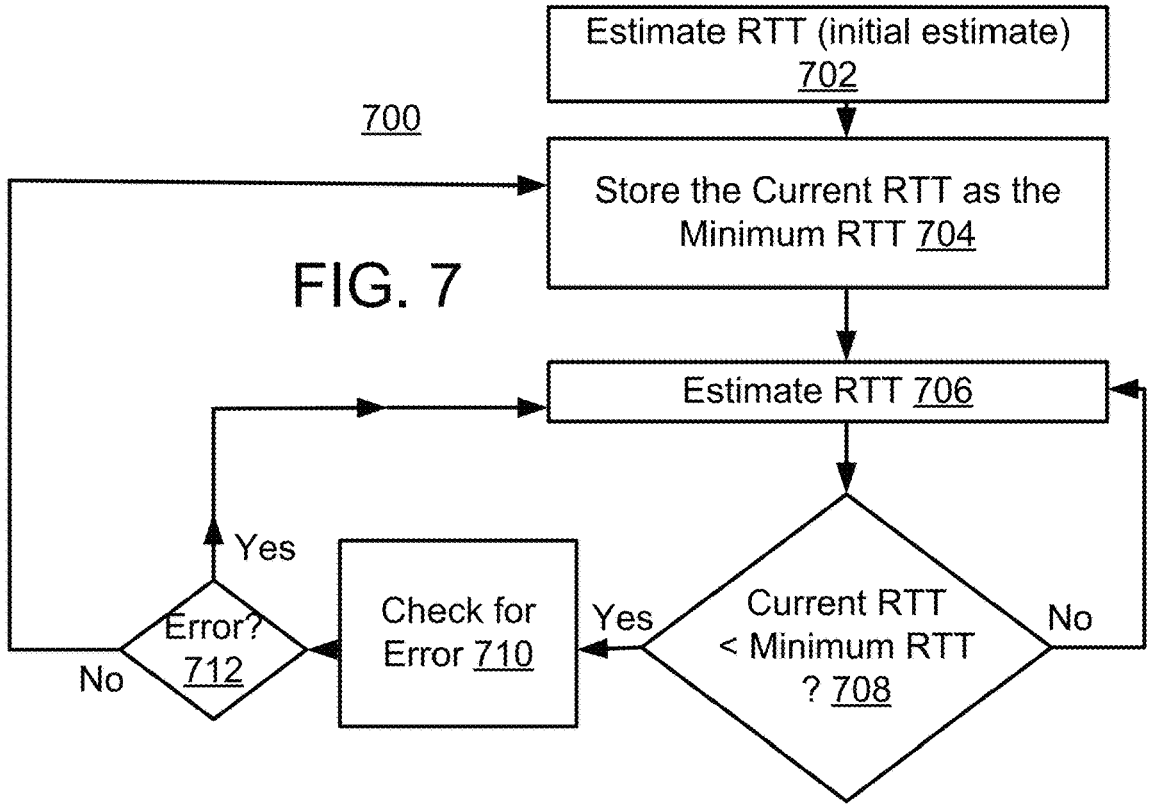
FIG. 7 shows a flowchart of an embodiment of a method of determining the minimum RTT.

FIG. 7 shows a flowchart of an embodiment of a method 700 of determining the minimum RTT. Method 700 may be an embodiment of RTT determination module 204. Method 700 may run in parallel with method 300 of FIG. 3 and may supply the RTT values for steps 302, 325, and/or 326. Alternatively, method 700 may supply the values for step 325, while the value of step 302 is supplied by method 600 (FIG. 6). Alternatively, method 700 may be called and/or be an embodiment of steps 302 and/or 325.

In step 702, an initial RTT is determined. Step 702 may involve calling method 600 (FIG. 6). In step 704, the initial RTT is stored as the minimum RTT. In step 706, the RTT is determined again to arrive a current RTT, which again may involve calling method 600 (FIG. 6).

In step 708, the current RTT is compared to the value stored as the minimum RTT to determine which is smaller. In step 708, if the value of current is greater than or equal to the value stored as the minimum RTT, the method returns to step 706 and again determines the RTT. If in step 708, it is determined that the current RTT is less than the value stored as the minimum RTT, the method proceeds to the next step.

Step 710 is optional (but if present is the next step after step 708). In step 710, the computation of the current RTT is checked for errors. For example, the information in the message and/or acknowledgement upon which the RTT computation is based are checked for reasonableness. For example, the RTT may be checked for whether the value for the RTT repeats.

In step 712, if there is an error, method 700 returns to step 706. Step 712 is optional and is not present if step 710 is not present. If in step 712, it is determined that there is no error, or if steps 710 and 712 are not present and it is determined in step 708 that the current RTT is less than the minimum RTT, method 700 precedes to step 704, where the current RTT is stored as the minimum RTT. After step 712, method 700 proceeds to step 704. In an embodiment, step 702 and step 302 are the same step and/or are embodiments of one another and the estimation of the RTT is performed once for both method 300 and 700. In an embodiment, step 706 is the same step 325 (or embodiment of one another) and/or step 708 is the same as step 326 (or embodiment of one another) and the procedures of step 706 and/or 708 are performed once for both methods 300 and 700.

FIG. 8 shows a flowchart of an embodiment of a method for implementing the error check of step 710 of FIG. 7, which is also performed by RTT determination module 204. In step 802, the header in information of the message is a read or retrieved. In step 804 a determination is made as whether the information in the header are acceptable values that are within acceptable ranges. For example, a check may be made to make sure that the sequence number is within the correct range to be a valid message that is in response to the acknowledgement sent (e.g., whether the acknowledgement number satisfies Ack No.≤Seq. No.≤Ack. No.+Window/mss). If it is determined that the header includes information that is outside of an acceptable range or is an inappropriate value, the method proceeds to step 806. In step 806, a flag may have be set to indicate that an error was detected. If in step 804, it is determined that all of the values in the header are acceptable values, the method 710 proceeds to step 808. In step 808, a flag is set to indicate that there is no error detected in the header information. After step 710 the method proceeds to step 712, which either causes the method 700 to return to step 704 or 706, depending on the results of step 710. Alternatively, steps 710 and 712 may be combined, and step 806 may cause method 700 to proceed to step 706 and step 808 may cause method 700 to proceed to step 704.

Allocation

FIG. 9 shows a flowchart of an embodiment of a method 900 for allocating bandwidth. Method 900 is an embodiment of bandwidth allocator 216.

In method 900, the flow is divided into satisfied and unsatisfied flows, which leads to the following equation (relationship 1), $$\Sigma_{f_i \in S} f_i + U_c = TB,$$

where S is the set of satisfied flows, U is the set of unsatisfied flows, TB is the bottleneck link capacity, and $U_c$ is the available bandwidth allocated for unsatisfied flows. The above equation states that the total of bandwidth used by the satisfied flows, plus the bandwidth allocated for the unsatisfied flows is a constant, which is the total available bandwidth at the bottle neck.

In step 902, method 900 when more bandwidth is allocated to satisfied flows, the bandwidth is taken from unsatisfied flows, and when more bandwidth is allocated to unsatisfied flows, the bandwidth is taken from satisfied flows, so that the total bandwidth allocated is the total bandwidth available. The sum of the bandwidth allocated to the satisfied flows $f_i$ and to the unsatisfied flows $U_i$ ($U_c$=Sum($U_i$) and optionally $U_i=U_c/|U|$, where U is the total number of unsatisfied flows) should equal the total bandwidth available, TB. In step 904, method 900 ensures that the no satisfied flows $f_i$ are allocated more bandwidth than the average bandwidth allocated to unsatisfied flows ($U_c/|U|$).

Initialization module 218, new flow module 220, increase in flow module 222, decrease in flow module 224, cessation of flow module 226 and optionally flow categorization module 228 apply step 902 and 904 to different situations, which include the initialization of the process, the introduction of a new flow, the increase of the bandwidth needed for a satisfied flow to remain a satisfied flow, the decrease in bandwidth required by a flow, the cessation of a flow, and checking whether a flow should remain as a satisfied or unsatisfied flow, respectively.

Figure 10A:
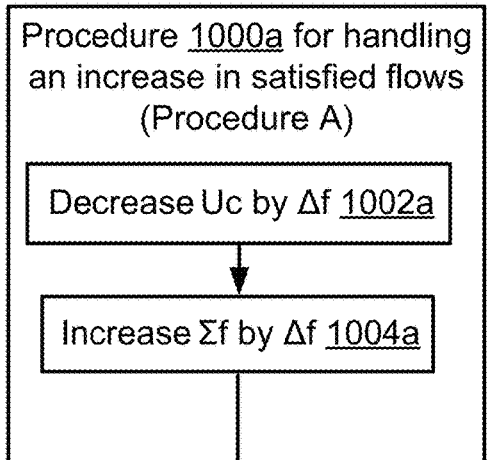
FIG. 10A shows flowchart of an embodiment of a method for implementing, which may be used in the embodiment of one of the steps of FIG. 9 in a situation in which it has been determined to increase the bandwidth allocated to a satisfied flow, which may be referred to as Procedure A.
Figure 10B:
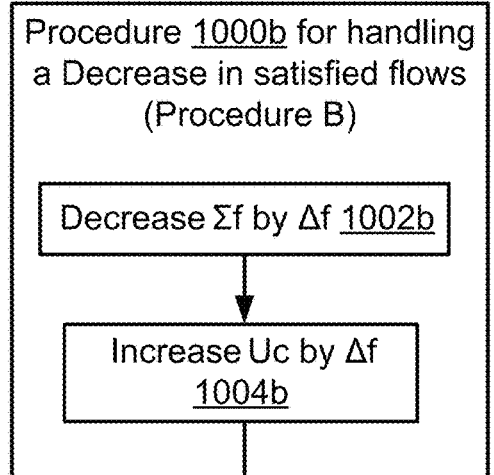
FIG. 10B shows flowchart of an embodiment of a method for implementing, which may be used in the embodiment of one of the steps of FIG. 9 in a situation in which it has been determined to decrease the flow allocated to the satisfied flows, which may be referred to as Procedure B.
Figure 10C:
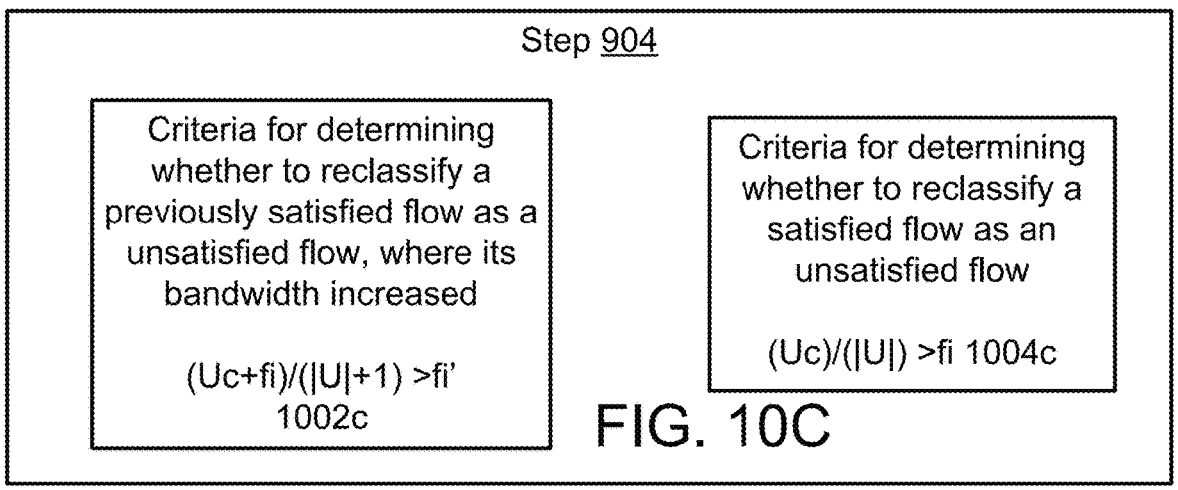
FIG. 10C shows a block diagram of an embodiment of criteria that may be checked to determine whether a flow should be treated as satisfied or unsatisfied.

In the methods of FIGS. 10A-10C, the bandwidth allocated to each unsatisfied flow is:

$$\frac{U_C}{|U|},$$

where |U| is the total number of unsatisfied flows. For example, if the total bandwidth allocated to all of the unsatisfied flows is 5×10⁶ bytes/sec and there are 500 unsatisfied flows, then $U_c=5\times10^6$, $|U|=500=5\times10^2$, and the bandwidth allocated to each unsatisfied is $U_c/|U|=5\times10^6/5\times10^2=1\times10^4$ bytes. The expression for the bandwidth allocated to each unsatisfied flow, individually, leads to a second relationship (relationship 2), $$\forall f_i \in S: f_i < \frac{U_C}{|U|},$$

where S is the set of satisfied flows. The above equation states that for each satisfied flow $f_1$, the bandwidth used is less than the average bandwidth used by the unsatisfied flows, $$\frac{U_C}{|U|}.$$

Relationship 2 is a fairness condition that says that it is undesirable to give a satisfied flow $f_1$ a flow rate that is larger than the flow allocated to unsatisfied flows $$\frac{U_C}{|U|}$$

(because if a previously satisfied flow's new rate is larger than the bandwidth allocated to unsatisfied flows, then the previously satisfied flow is now an unsatisfied flow. The flow has essentially changed state. If the flow is not relabelled or recategorized to being an unsatisfied flow then the second relationship has been violated and consequently the algorithm will not work). In other embodiments, a different fairness condition may be imposed instead of the above inequality. For example, some customers may be allocated a larger bandwidth than other customers based on how much that particular customer pays, the importance of that customer's use of the bandwidth is to society, and/or based on need. For example, a user that only uses the Internet for sending emails, may be more tolerant of a low bandwidth connection than a user that uses their internet connection for video conferencing and/or gaming. As another example, users that use their connection for recreation may be allocated a connection with a higher latency than first responders to an emergency situation, such as fire fighters and/or emergency care personnel. Based on the above two relationships, a state machine can be produced that maintains a fairness property.

FIG. 10A shows flowchart of an embodiment of a method 1000a for implementing step 904 in a situation in which it has been determined to increase the flow allocated to the satisfied flows, which in later flowcharts is referred to as Procedure A. In an embodiment, method 1000a is applied after it has been determined that increasing the bandwidth allocated to a particular satisfied flow will not cause that particular satisfied flow to violate the inequality of step 904 (FIG. 9). In an embodiment, method 1000a is applied after it has been determined that increasing the bandwidth allocated to a particular satisfied flow will not cause any satisfied flow to violate the inequality of step 904 (FIG. 9).

In step 1002a, the bandwidth allocated to the unsatisfied flows is decrease by the amount desired to increase the bandwidth allocated to satisfied flows.

In step 1004a the bandwidth allocated to the satisfied flows is increase by the amount that the bandwidth allocated to unsatisfied flows was decreased. In an embodiment, steps 1002a and 1004a are performed simultaneously. In another embodiment, step 1002a is completed before step 1004a is completed, so as to not result in a situation in which more bandwidth has been allocated than is available.

FIG. 10B shows a flowchart of an embodiment of a method 1000b for implementing step 904 in a situation in which it has been determined to decrease the flow allocated to the satisfied flows, which in later flowcharts is referred to as Procedure B.

In step 1002b, the bandwidth allocated to the satisfied flows is decreased (e.g., by an amount that is no longer needed by the satisfied flows).

In step 1004a, the bandwidth allocated to the unsatisfied flows is increased by the amount that the bandwidth allocated to the satisfied flows was decreased. In an embodiment, steps 1002b and 1004b are performed simultaneously. In another embodiment, step 1002b is completed before step 1004b is completed, so as to not result in a situation in which more bandwidth has been allocated than is available.

FIG. 10C are the criteria 1000c checked to determine whether a flow should be treated as satisfied or unsatisfied. Criteria 1000c are an embodiment of step 904. In step 1002c, a currently satisfied flow is checked to determine whether the bandwidth it satisfies, $$\frac{U_C}{|U|} \geq f_i.$$

If the flow satisfies the above relationship, the flow uses less than the same amount as the average unsatisfied flow has been allocated, and there is no need to reclassify the flow and change the manner in which the flow is treated. If the flow does not satisfy the above relationship, the flow uses more than the average unsatisfied flow has been allocated, and so it would not be fair to continue to satisfy flow $f_i$. Consequently, the flow is reclassified as unsatisfied and then in an embodiment, the amount of bandwidth that the flow is allocated is the average bandwidth allocated to unsatisfied flows. Step 902 may be need to be performed after another flow has changed from being satisfied to unsatisfied or upon taking bandwidth from the unsatisfied flows to keep a satisfied flow satisfied.

In step 1004c, a determination is made as to whether a satisfied flow that needs more bandwidth satisfies the criteria of $$\frac{U_C + f_i}{|U|+1} > f'_i,$$

where $f'_i$ is the bandwidth required by the ith flow, if the ith flow is kept satisfied, where $f_i$ is the current flow. In other words, the new bandwidth allocated to all of the unsatisfied flows would be $U_c+f_i$ assuming that the transfer is made, where $U_c$ is the current bandwidth allocated to all of the unsatisfied flows prior to making the transfer, $f_i$ is the current flow of the flow i, prior to making the transfer, and $f'_i$ is what the flow will be after the transfer is made. If the above inequality is false, then the new allocation would exceed the unsatisfied allocation and therefore the flow should be reclassified as an unsatisfied, and in an embodiment, the bandwidth allocated to the flow is the average bandwidth allocated to unsatisfied flows. If the above inequality is satisfied, then the additional bandwidth needed by flow $f_i$ is taken from the bandwidth allocated to the unsatisfied flows.

Note that since $f_i$ was a satisfied flow, $$f_i < \frac{U_C}{|U|},$$

and since adding to an average a value that is below the average lowers the average, $$\frac{U_C}{|U|} > \frac{U_C + f_i}{|U|+1}.$$

In other words, since $$f_i < \frac{U_C}{|U|},$$

therefore $$\frac{U_C + f_i}{|U|+1} < \frac{U_C + U_C/|U|}{|U|+1} = \frac{U_C(1+1/|U|)}{|U|+1} = \frac{U_C\left(1+\frac{1}{|U|}\right)}{|U|\left(1+\frac{1}{|U|}\right)} = \frac{U_C}{|U|}.$$

Thus, checking whether $$\frac{U_C + f_i}{|U|+1} > f_i'$$

is a more stringent test for whether the increased flow should be grouped with the satisfied or unsatisfied flows than checking whether $$\frac{U_C}{|U|} > f_i'$$

and consequently there is no need to also check whether $$\frac{U_C}{|U|} > f_i'.$$

Figure 11:
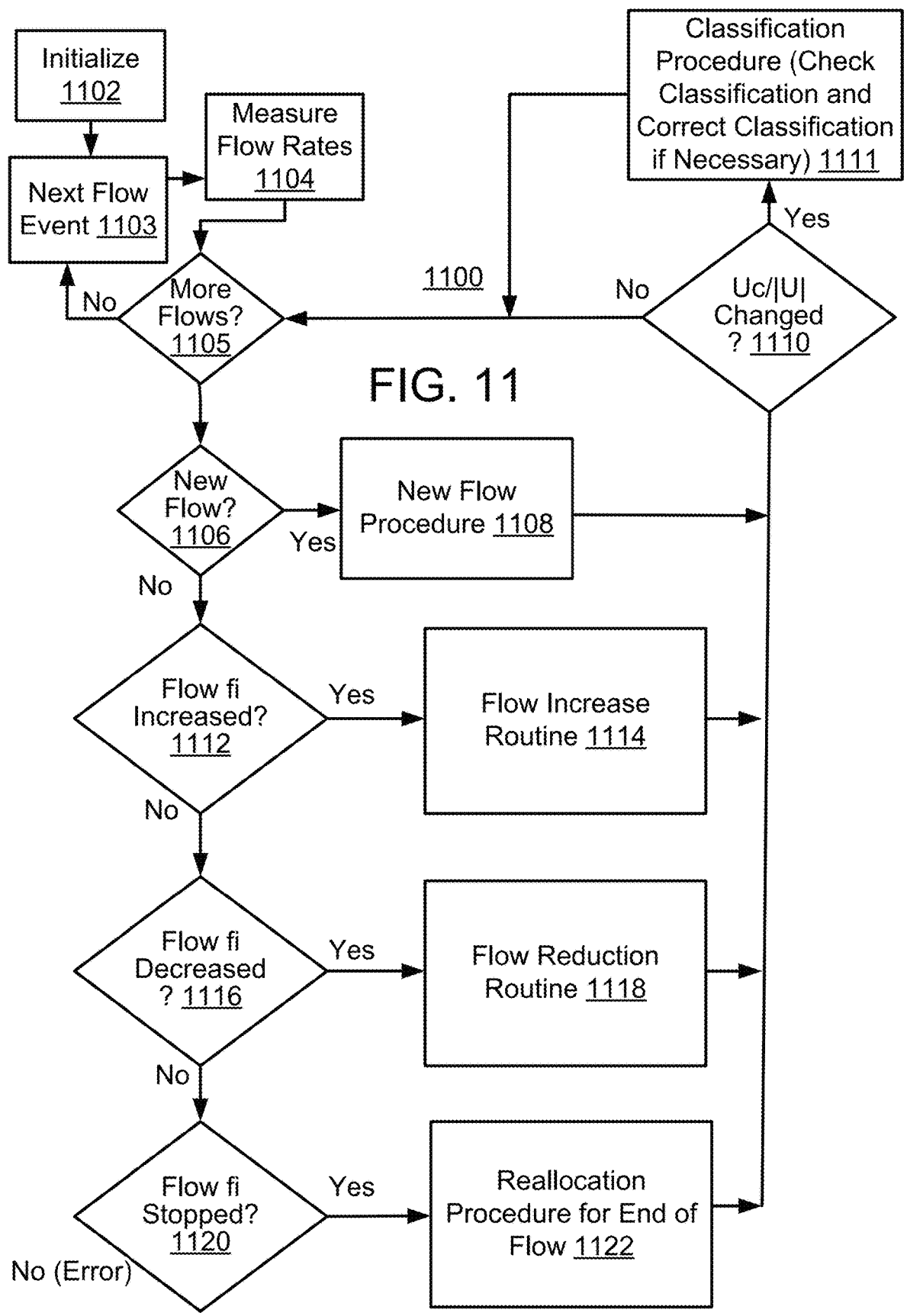
FIG. 11 shows a flowchart of an embodiment of a method of allocating bandwidth between flows.

FIG. 11 shows a flowchart of an embodiment of a method 1100 of allocating flow. Method 1100 is an embodiment of method 900. Method 1100 is an embodiment of an algorithm implemented by bandwidth allocator module 216.

In step 1102 an initialization procedure is implemented for initializing method 1100. Step 1102 may be an embodiment of an algorithm implemented by initialization module 218, which will be discussed further in conjunction with FIG. 12.

In step 1103, method 1100 waits for the next flow event. In other words, after initially stepping through each flow and handling each flows according to initialization step 1102, method 1100 may wait a predetermined amount of time before again checking the bandwidth required by each flow to see if the bandwidth that is required by the flow has changed, for example. In an embodiment, periodically (e.g. every 250 ms), the bandwidth required by individual flows are measured and a list the flows in order of the bandwidth required may be assembled or updated based on the bandwidths measured. Other intervals of time may be chosen for measuring bandwidths, such as 50 ms, 100 ms, 150 ms, 200 ms, 300 ms or 350 ms, for example. In step 1104, the flows are remeasured, or optionally, the bandwidth required by unsatisfied flows for the first time may be determined, so that it can be determined whether the flow ceased, a new flow has been added, and/or the bandwidth of a flow changed. In step 1104, the bandwidth of each flow is checked and optionally list of flows 234 is update (or created, as is appropriate). In step 1104, previously, unsatisfied flows may be checked to determine whether the flow can now be satisfied. If a flow requires more than a threshold value of bandwidth, the flow is assumed to require an infinite bandwidth and may be placed in the list flows (e.g., list of flows 234) in a portion of the list which has any other flows that require more bandwidth than the predetermined threshold, and the exact amount of bandwidth required to satisfy flows that require more than the predetermined threshold may be left undetermined. The flows that require more than the threshold of bandwidth, may be listed in the list of flows in any order with respect to each other. The threshold could be any values between about Uc/|U| and Uc. In an embodiment, the threshold is close to but higher than Uc/|U|, such as 1.05 Uc/|U| or any value between 1.01 Uc/|U| and 1.1 Uc/|U| or between 1.01 Uc/|U| and 1.2 Uc/|U|. In another embodiment, the threshold is Uc/|U|. In another embodiment, the threshold is 1.1 Uc/|U|. In another embodiment, the threshold is 1.01 Uc/|U|. In another embodiment, the threshold is Uc.

In step 1105, a determination is made as to whether there are any flows that need to be checked as to whether the flow is categorized properly or whether any changes occurred in the bandwidth required by the flows as compared to the flow before the bandwidths were re-measured in the most recent event. Just after measuring the bandwidths of the flows, all the flows may need to be checked to see whether the flow should be recategorized and step 1105 may check the first flow of the flows that need[s] to be changed. Alternatively, rather than inspecting each flow individually in a loop, any number of flows or all flows may be inspected in parallel. In another embodiment, instead of steps 1102-1105, method 100 waits until there is an indication that the allocation of the bandwidth may need to change.

If in step 1105, it is determined that all flows have been checked, or all flows that need to be checked have been checked, method 1100 returns to step 1103 and waits for the next event.

In step 1106, a determination is made whether a flow is a new flow or whether the change is the bandwidth allocation resulting from a new flow being introduced. If the flow is a new flow, the method 1100 proceeds to step 1108 in which an algorithm for handling the introduction of a new flow is implemented. Step 1108 may be an embodiment of an algorithm implemented by new flow module 220, which will be discussed further in conjunction with FIG. 13. After step 1108, method 1100 proceeds to step 1110 to determine whether the amount of bandwidth allocated to unsatisfied flows has changed. In step 1110, if the amount of bandwidth allocated to each individual unsatisfied flow has increased (as a result of another step other than step 1108), there may be flows categorized and treated as unsatisfied (e.g., which are therefore being allocated a bandwidth of $U_c/|U|$), but which are really satisfied (e.g., because $f_i<U_c/|U|$), which may result in some bandwidth being unused. Similarly, if the amount of bandwidth has decreased (e.g., as a result of the new flow or step 1108 or as a result of another step), there may be a flow that is being treated as satisfied, but in fact uses more bandwidth than the average bandwidth allocated per unsatisfied flow (in other words, $f_i>U_c/|U|$). Consequently, if the amount of bandwidth that is allocated to unsatisfied flows has changed, each of the unsatisfied flows may need to be checked in the situation in which the bandwidth allocated to unsatisfied flows increased or each satisfied flow may need to be checked in the situation in which the bandwidth allocated to unsatisfied flows decreased. If there has been a change, method 1100 proceeds to step 1111 to check whether the classification and treatment of one of the flows needs to be changed to ensure that $f_i<U_c/|U|$ for all satisfied flows or to ensure that the all or nearly all of the bandwidth is allocated. Step 1111 may be an embodiment of an algorithm implemented by flow categorization module 228. Steps 1110 and 1111 are optional. If in step 1106, it was determined that the flow is not a new flow, method 1100 proceeds to the next step.

In step 1112, a determination is made whether a flow increased its need for bandwidth. If a flow increased its need for bandwidth, the method 1100 proceed to step 1114 in which an algorithm for handling the increased need for bandwidth of a flow. Step 11114 may be an embodiment of an algorithm implemented by increased flow module 222, which will be discussed further in conjunction with FIG. 14. After step 1114, method 1100 proceeds to step 1110 to determine whether the amount of bandwidth allocated to unsatisfied flows has changed. If in step 1112, it was determined that no flow increased its need for bandwidth, method 1100 proceeds to the next step (e.g., step 1116).

In step 1116, a determination is made whether a flow decreased its need for bandwidth. If a flow decreased its need for bandwidth, the method 1100 proceed to step 1118 in which an algorithm for handling the increased need for bandwidth of a flow. Step 11118 may be an embodiment of an algorithm implemented by decreased flow module 224, which will be discussed further in conjunction with FIG. 15. After step 1118, method 1100 proceeds to step 1110 to determine whether the amount of bandwidth allocated to unsatisfied flows has changed. If in step 1116, it was determined that no flow decreased its need for bandwidth, method 1100 proceeds to the next step (e.g., step 1120).

In step 1120, a determination is made whether a flow stopped (e.g., one of the user devices was turned off or an edge network is no longer in use). If a flow stopped, the method 1100 proceeds to step 1122 in which an algorithm for handling the cessation of a flow. Step 1122 may be an embodiment of an algorithm implemented by cessation of a flow module 226, which will be discussed further in conjunction with FIG. 16A. After step 1122, method 1100 proceeds to step 1110 to determine whether the amount of bandwidth allocated to unsatisfied flows has changed. If in step 1120 it was determined that no flow decreased its need for bandwidth, method 1100 proceeds to the next step (e.g., step 1105). If the flow was not a new flow, the flow's bandwidth needs are unchanged, and the flow did not stop, method 1100 returned to step 1103, and the next flow inspected. Steps 1106, 1112, 1116, and 1120 may be performed in any order with respect to one another and/or may be performed simultaneously.

Initialization Method

Figure 12:
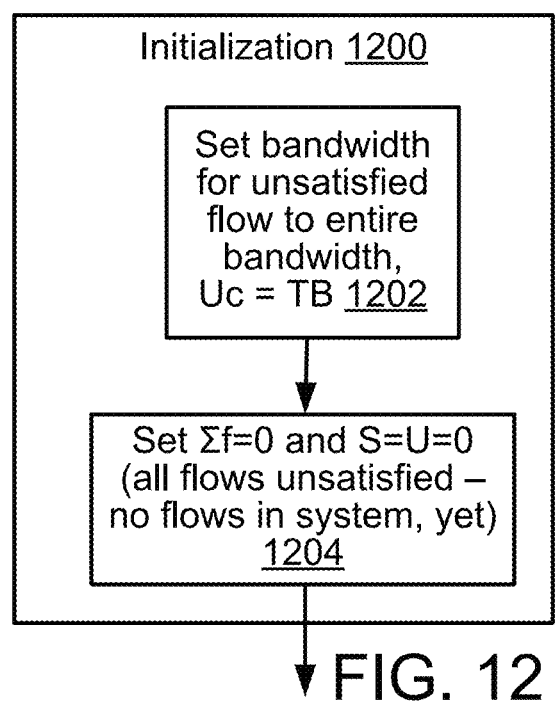
FIG. 12 shows a flowchart of an embodiment of a method for initializing a method, which may be used in the embodiment of the method of FIG. 11 (which is an embodiment of the initialization process of FIG. 11).

FIG. 12 shows a flowchart of an embodiment of an initialization process 1200. Initialization process 1200 may be an embodiment of step 1102 and may be an embodiment of the process implemented by initialization module 218. In FIG. 12, the symbol $U_c$ represents the bandwidth allocated to the unsatisfied flows and TB is the total bandwidth or total non-UDP bandwidth. In step 1202, all of the bandwidth is allocated to unsatisfied flows, and all of the flows are initially treated as unsatisfied flows, and thus initially Uc=TB. In method 1200, initially sets $U_c$ so that $U_c$=TB (the total bandwidth or the total non-UDP bandwidth) and $U$ and $S$ are set so that $|U|+|S|=0$,

|S| is the number of satisfied flows (and U is the number of unsatisfied flows).

If U is empty, then $U_c$ represents the amount of the bandwidth that is unused, which initially, before any bandwidth is assigned to any particular flow is the entire bandwidth.

In step 1204, U, the variable representing the number of unsatisfied flows U and the variable representing the number of unsatisfied flows, S, are set to zero. The bandwidth allocated to satisfied flows is also set to zero. After step 1204, method 1100 is ready to proceed to the next step. Steps 1202 and 1204 may be performed concurrently or in any order.

Method for New Flows

Figure 13:
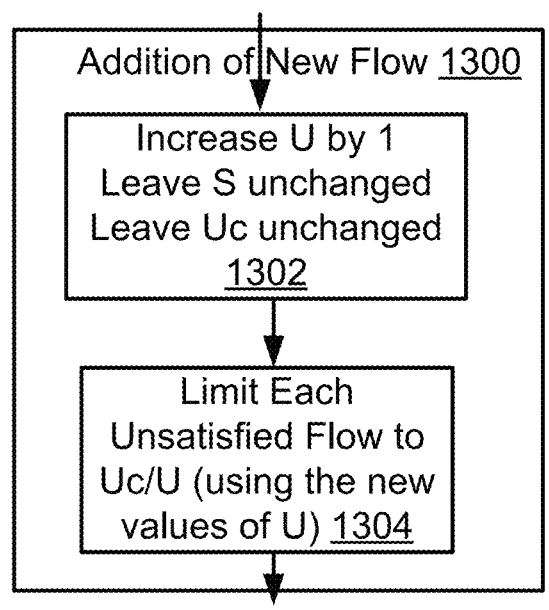
FIG. 13 shows a flowchart of an embodiment of a process for handling new flows.

FIG. 13 shows a flowchart of an embodiment of a process 1300 for handling new flows. Process 1300 may be an embodiment of step 1108 and may be an embodiment of the process implemented by new flow module 220.

In method 1300, when a new flow arrives, the new flow is assumed to be unsatisfied and the new flow is placed in the unsatisfactory group. Adding the new flow to the unsatisfied flows, after recomputing $U_c/U$ via method 1300, will reduce the value of $U_c/U$, because although $U_c$ is unchanged, the bandwidth, $U_c$, must be shared with an extra flow.

In step 1302, the variable representing the total number of unsatisfied flows, U, is incremented by 1, and the variable representing the total number of satisfied flows, S, is left unchanged.

In step 1304, the amount of bandwidth allocated to the other unsatisfied flows (if there are any) is adjusted based of the addition of another flow. In an embodiment, the amount of bandwidth allocated to each unsatisfied flow is $U_c/|U|$. Thus, after the addition of a new flow, the amount of bandwidth allocated to each unsatisfied to decreased from $U_c/|U'|$ to $U_c/|U|$, where U=U'+1, and where U' is the total number of flows prior to the addition of the new flow (and U is the current number of unsatisfied flows). If the current flow is the first flow added to the system after initialization U=1, $U_c$=TB (the total bandwidth or the total non-UDP bandwidth), and the new flow is allocated the entire bandwidth. After step 1304, method 1100 proceeds to the next step after 1108 in FIG. 11 (e.g., step 1110). At the next event (e.g., the next implementation of step 1104), the bandwidth required by the new flow (that for now has been classified as unsatisfied) is measured to determine whether the flow should remain an unsatisfied flow. Alternatively, immediately after being classified as unsatisfied, the bandwidth of the flow may be measured and the flow may be transferred to being a satisfied flow if the bandwidth required is low enough. After a new flow is classified as an unsatisfied flow, when the bandwidth of the new flow is measured, if the flow is below the threshold (e.g., below the threshold that is close to but higher than so that the bandwidth that is required is not treated as requiring an infinite amount of bandwidth), the newly measured flow is treated as a reduction of flow.

Method for Flow Increase

Figure 14:
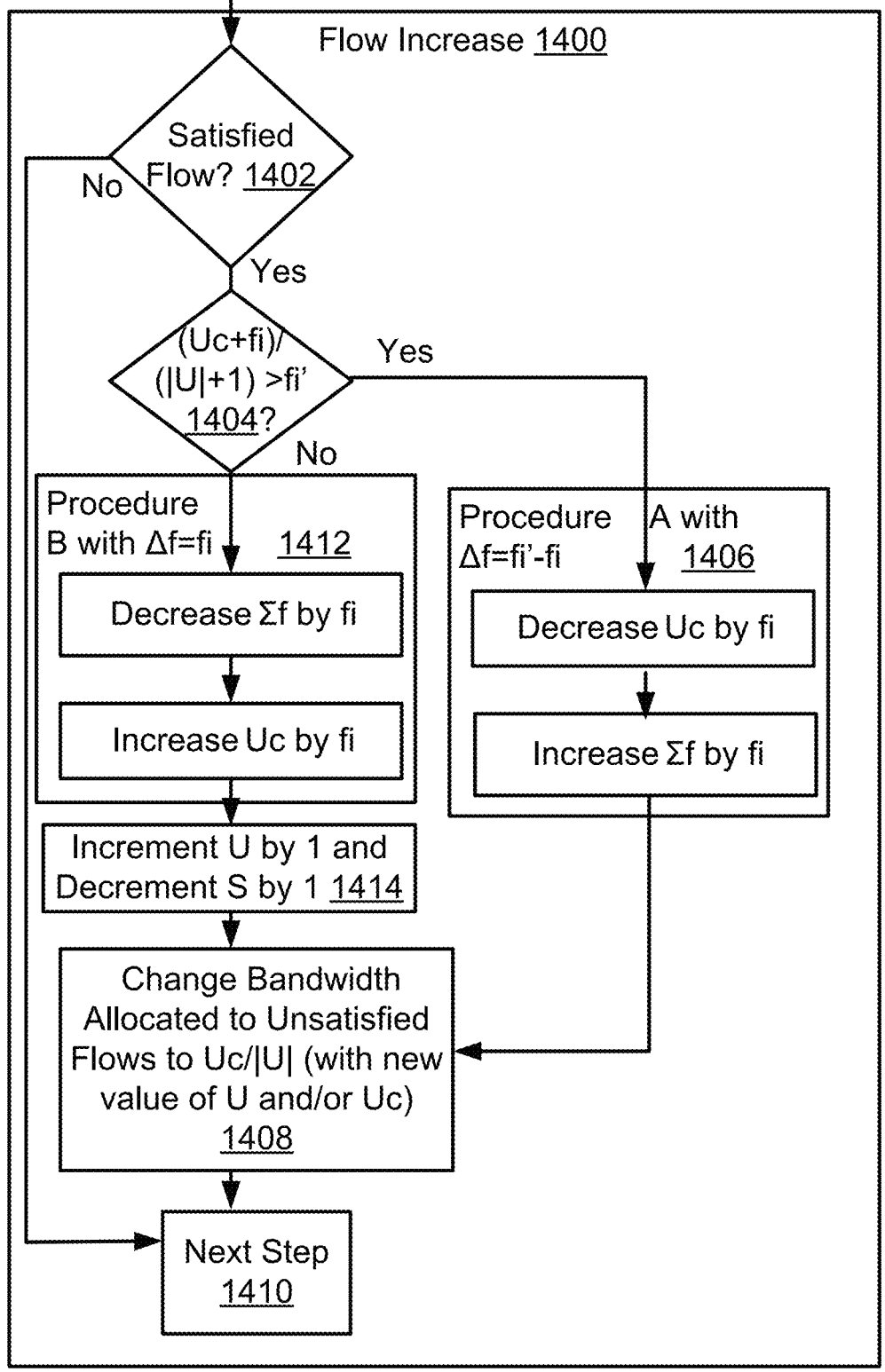
FIG. 14 shows a flowchart of an embodiment of a method of handling an increase in the bandwidth that a flow requires to be satisfied.

FIG. 14 shows a flowchart of an embodiment of a method 1400 of handling an increase in the bandwidth that a flow requires to be satisfied. Method 1400 is an embodiment of step 1114 (FIG. 11) and an embodiment of a process that may be implemented by increase in flow module 222 (FIG. 2).

In method 1400, if a flow's rate increases or the bandwidth that the flow requires increases, the flow should only be a flow that was previously satisfied, because unsatisfied flows are at the maximum bandwidth that flows are limited to, already. Consequently, if a flow rate increases, a check should be performed to determine whether the increase is enough to transfer the flow to the set of unsatisfied flows.

In step 1402, a determination is made as to whether the flow is satisfied or unsatisfied. If in step 1402, the flow was satisfied until the current increased need, then method 1400 proceeds to step 1404. In step 1404, a determination is made as to whether $$\frac{U_C + f_i}{|U|+1} > f'_i,$$

as a test for whether the flow should be transferred to the unsatisfied flows, a computation is performed to see whether the following inequality is met (see the discussion of step 1004c, FIG. 10C, above). If the inequality of step 1404 (and 1004c) is satisfied, then method 1400 proceeds to step 1406.

In step 1406, procedure A, method 1000a (FIG. 10A) is implemented, which has the effect of removing bandwidth from the unsatisfied flows and allocating the same amount of bandwidth to flow i, so that flow i can remain satisfied. In other words, if the inequality is true, then the relationship 1 (step 902, FIG. 9) may be maintained/implemented according to the equation, $$\left(\left(\sum_{f_i \in S} f_i\right)' - (f_j - f'_j)\right) + (U'_C + (f_j - f'_j)) = \sum_{f_i \in S} f_i + U_C = TB$$

Note that in this case, the additional needed bandwidth that is needed to keep flow j satisfied, is taken from the bandwidth that was allocated to the unsatisfied flows, and the new amount of bandwidth that is allocated to the unsatisfied flows is reduced by $f'_j - f_j$, and the new amount of bandwidth that is allocated to unsatisfied flows is $U_c' = (U_c - (f'_j - f_j))$ (note that since the flow increased the new flow $f'_j$ is greater than the old flow $f_j$ (and $(f'_j - f_j) > 0$). Since the additional needed flow is taken from the unsatisfied flows, each unsatisfied flow becomes further from being satisfied, and there is no need to check whether any of the unsatisfied flows are now satisfied, but it may be desirable to check whether all of the previously satisfied flows meet the new more stringent criteria of $$f_i < \frac{U'_C}{|U|}.$$

Also note that $(\Sigma_{f_i \in S} f_i)' - (f_j - f'_j) = \Sigma_{f_i \in S} f_i$. In other words, the prime on the sum of satisfied flows the left side of the above equation (which is the sum of the satisfied flows before reallocating the bandwidth) indicates that the sum on the left side is the equation is different than the sum on the right side of the equation (which is the sum of the satisfied flows after reallocating bandwidth).

After step 1406, method 1400 proceeds to step 1408, where in an embodiment the bandwidth allocated to the unsatisfied flows is reallocated, so that each is allocated an equal amount of bandwidth allocated to unsatisfied flows divided by the number of unsatisfied flows (which may change as a result of $U_c$ being reduced or as a result of U being increased). Alternatively, the bandwidth may be allocated among the unsatisfied flows in another manner, such as in a manner proportional to a function of the flow's need. After step 1408, method 1400 proceeds to step 1410, where method 1100 proceeds to the next step.

Returning to step 1404, if the inequality $$\frac{U_C + f_i}{|U|+1} > f'_i,$$

is not satisfied, the method 1400 proceeds to step 1412, which is an embodiment of procedure B, method 1000B (FIG. 10B). In step 1412, the flow $f_i$ is treated as unsatisfied, and the bandwidth previously allocated to flow $f_i$ is now added to the bandwidth allocated to unsatisfied flows, and flow i is now allocated a bandwidth of Uc/|U|.

In other words, in step 1412, if the flow does not satisfy the above inequality and needs to be reclassified as unsatisfied, to ensure that all of the bandwidth (no more no less) tends to be allocated or essentially the total bandwidth available for TCP traffic is allocated, the reallocation of the bandwidth is performed according to the following equation, $$\left(\left(\sum_{f_i \in S} f_i\right)' - f_j\right) + (U'_C + f_j) = \sum_{f_i \in S} f_i + U_C = TB$$

(thereby, accomplishing step 902, FIG. 9), and keeping the bandwidth allocated an invariant quantity. In other words, as a result of the change of flow $f_i$ from being a satisfied flow to being an unsatisfied flow, the new amount of bandwidth allocated to unsatisfied flows, $U_c$, is given by $U_c' + f_j$, where $U_c'$ is the prior amount of flow allocated to unsatisfied flows before the flow was reclassified from satisfied to unsatisfied and the amount of bandwidth allocated to satisfied flows is reduced from $(\Sigma_{f_i \in S})'$ to $\Sigma_{f_i \in S} f_i = ((\Sigma_{f_i \in S} f_i)' - f_j)$.

After method 1400 proceeds from step 1412 or 1414.

In step 1414, the variable representing the number of unsatisfied flows (U) is incremented by one, and the variable representing the number of satisfied flows (S) is decreased by one, so that the sum of the unsatisfied and satisfied flows is the total number of flows. After step 1414, the method 1400 proceeds to step 1408 (and then proceeds to step 1410 and to the next step of FIG. 11.

In both scenarios, whether the inequality of step 1404 is true or not, the bandwidth allocated to individual unsatisfied flows is reduced. The reduction in unsatisfied bandwidth means that an existing satisfied flow may now be unsatisfied. So, after method 1400, step 1114 of FIG. 11, the list of flows is looped (e.g., by flow categorization module 228, FIG. 2 and/or step 1111, FIG. 11) through from largest to smallest and each flow is checked to see if that flow satisfies the inequality of step 904 (FIG. 9) to see if the flow should be transferred to the unsatisfied category.

Method for Flow Reduction

Figure 15:
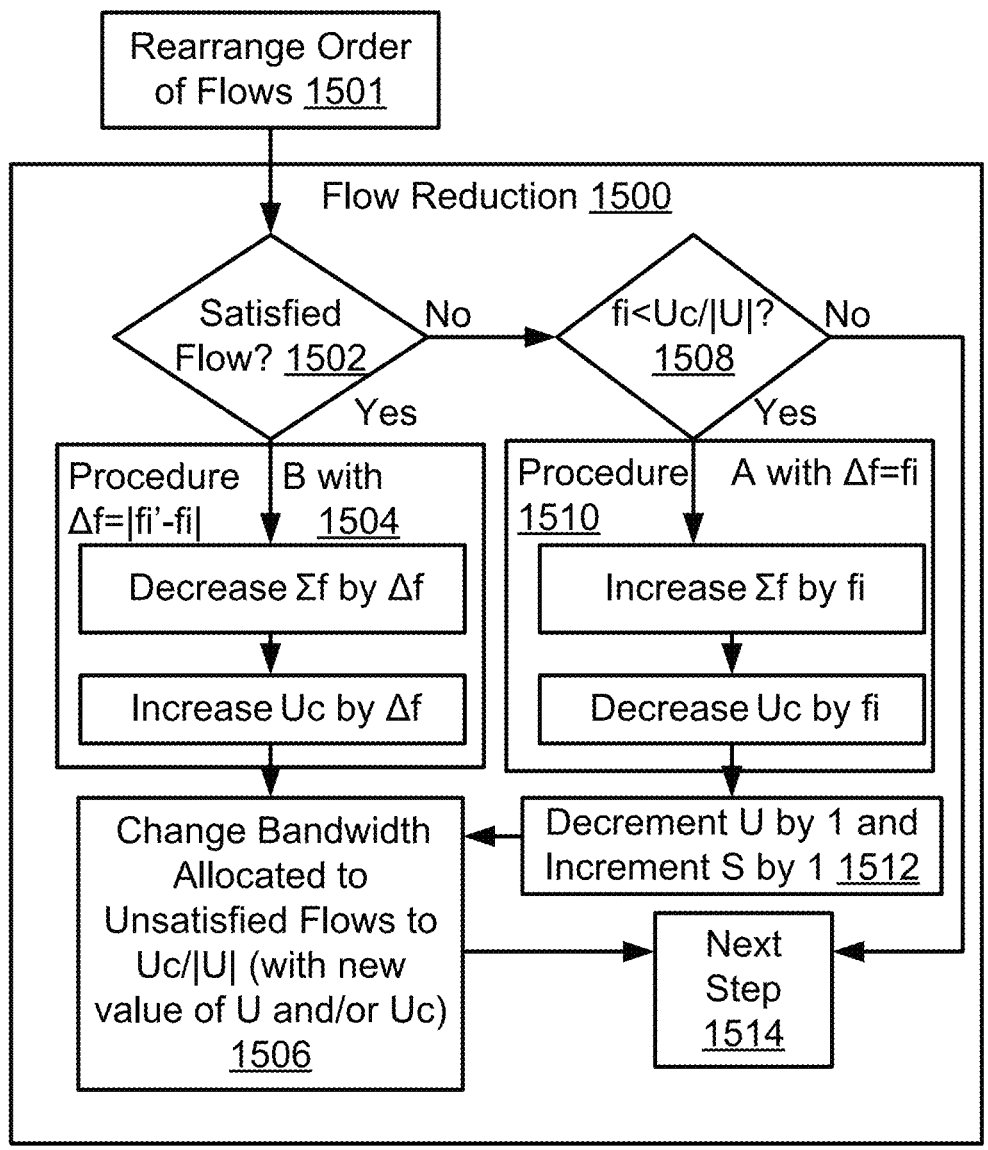
FIG. 15 shows a flowchart of an embodiment of a method of handling a decrease in the bandwidth required by a flow.

FIG. 15 shows a flowchart of an embodiment of a method 1500 of handling the decrease in bandwidth required by a flow. Method 1500 is an embodiment of step 1118 (FIG. 11).

If a flow rate is reduced, so that the flow is not using the flow's full current allocation (so that now the flow is a satisfied flow), then it may be desirable to maintain the first invariant and depending on whether the flow was previously an unsatisfied flow, it may be desirable to transfer bandwidth between flows. A flow reduction may occur when a satisfied flow no longer requires as much bandwidth as previously. A flow reduction may occur when a previously unsatisfied flow now requires a low enough flow that the flow may now be satisfied. A flow reduction may occur when a previously unsatisfied flow, such as a new flow, which just prior to the most recent measurement of the flow was considered to require an infinite amount of flow, is now measured to have a flow that is less than the threshold for treating the flow as requiring an infinite amount of bandwidth (e.g., less than 1.05 $U_c/|U|$) or alternatively less than $U_c/|U|$.

In step 1502, a determination is made whether the flow was previously satisfied or not. If the flow was previously satisfied, the flow will remain of course satisfied, since the bandwidth the flow now requires is less. If the flow was previously satisfied, the method proceeds to step 1504.

In step 1504, procedure B (method 1000b, FIG. 10B) is implemented, and as part of step 1504, the total bandwidth allocated to satisfied flows is decreased by the bandwidth that is no longer required, which is the difference $\Delta f=|f_i'-f_i|$ between the bandwidth previously required $f_i$ and the bandwidth currently required $f_i'$. In step 1504, the excess bandwidth $\Delta f$ is added to the total bandwidth allocated to the unsatisfied bandwidth.

Specifically, if the flow ($f_j$) was unsatisfied prior to the flow rate reduction, since the flow is satisfied now (as a result of the size of the decrease in flow), the flow may now be transferred from being designated as an unsatisfied flow to a satisfied flow. So, the flow may be moved to the satisfied group, and to maintain the first relationship (step 902), subtract the new allocation from $U_c$ according to the following equation:

$$\left(\left(\sum_{f_i \in S} f_i\right)' + f_j\right) + (U_C' - f_j) = \sum_{f_i \in S} f_i + U_C = TB$$

In other words, as a result of the change of flow $f_j$ from being an unsatisfied flow to being a satisfied flow, the new amount of bandwidth allocated to unsatisfied flows, $U_c$, is given by the term $U_c'-f_j$, where $U_c'$ is the prior amount of flow allocated to unsatisfied flows. Note also that $(\Sigma_{f_i \in S} f_i)'+f_j=\Sigma_{f_i \in S} f_i$, where $(\Sigma_{f_i \in S} f_i)'$ is the sum of satisfied flows prior to reallocating bandwidth and $\Sigma_{f_i \in S} f_i$ is the sum of satisfied flows after reallocating bandwidth (note that the total bandwidth is a constant or TB=C).

After step 1504, method 1500 proceeds to step 1506.

In step 1506, the amount of bandwidth allocated to each unsatisfied bandwidth is increased to Uc/|U| (where $U_c$ is now greater, than prior to the decrease in bandwidth needed by $f_i$, as a result of $U_c$ being incremented by $\Delta f$).

Returning to step 1502, if the flow was previously unsatisfied, the method proceeds to step 1508, and a determination is made whether the flow now satisfies, the criteria to be a satisfied flow, which is whether the bandwidth required by the flow is less than the bandwidth allocated to the average unsatisfied flow, $f_i<U_c/|U|$. If in step 1508, it is determined that the unsatisfied flow now meets the criteria for being satisfied, step 1508 proceeds to step 1510.

In step 1510, procedure A (method 1000a, FIG. 10A) is implemented, and the amount of bandwidth allocated to unsatisfied bandwidths is decreased by the bandwidth needed by the flow, and the amount of bandwidth allocated to satisfied bandwidth is increased by the bandwidth required by flow $f_i$. Since the new satisfied flow requires less flow than the average bandwidth allocated to unsatisfied flows, the average bandwidth allocated to unsatisfied flows is increased (which could lead to other unsatisfied flows becoming satisfied).

In other words, if the flow was already satisfied and the bandwidth now required by that flow has been reduced, then add the reduction in bandwidth to $U_c$ like so:

$$\left(\left(\sum_{f_i \in S} f_i\right)' - (f_j - f_j')\right) + (U_C' + (f_j - f_j')) = \sum_{f_i \in S} f_i + U_C = TB$$

In the above expression, $f_j$ is the prior value of the flow, $f_j'$ is the current value of the flow, so that $(f_j-f_j')$ is the reduction in the flow required by flow j. In other words, as a result of the change of flow $(f_j-f_j')$ of flow j (which now requires less bandwidth), the new amount of bandwidth allocated to unsatisfied flows, $U_c$, is given by the prior the equations $U_c'+(f_j-f_j')$, where $U_c'$ is the prior amount of flow allocated to unsatisfied flows. Stated differently, as a result of flow j now requiring less bandwidth, the total amount of bandwidth allocated to the unsatisfied flows may be increased, and the amount by which the bandwidth allocated to unsatisfied flows is increased is $(f_j-f_j')$, which is also the reduction in bandwidth required by the satisfied flows. Note that in both occasions (whether a flow that was previously unsatisfied now needs less bandwidth and is now a satisfied flow, or a flow that was previously satisfied now needs less bandwidth), the rate allocated to an unsatisfied flow has increased. In the first scenario $U_c$ is reduced, but that is overcompensated by the reduced number of members of the group of unsatisfied flows, so that the quantity $U_c/|U|$, the amount of bandwidth allocated to each unsatisfied flow, is increased as result of |U| being a smaller number. Since the total number of members of satisfied flows S is only increased, there is no need to check for whether any other flows need to be transferred or relabeled from being satisfied flows to being unsatisfied flows or form being unsatisfied flows to being satisfied flows as a result of relabeling the previously unsatisfied flow to being a satisfied flow, and the flow rate reduction algorithm for handling the reduction of a flow stops until needed again or invoked is for another flow rate reduction. Note that $(\Sigma_{f_i \in S} f_i)'-(f_j-f_j')=\Sigma_{f_i \in S} f_i$, where $(\Sigma_{f_i \in S} f_i)'$ is the sum of satisfied flows prior to reallocating bandwidth and $\Sigma_{f_i \in S} f_i$ is the sum of satisfied flows after reallocating bandwidth.

After step 1510, the method proceeds to step 1512.

In step 1512, the variable representing the number of unsatisfied flows is decreased and the variable representing the number of satisfied flows is increased. After step 1512, method 1500 proceeds to step 1508, where the average bandwidth allocated to unsatisfied flows adjusted to $U_c/|U|$ (where $U_c$ is now less than the previous value for $U_c$, as a result of having been decreased by $f_i$, and U is now 1 less than previously, resulting in an increase in $U_c/|U|$).

Returning to step 1508, if in step 1508, it is determined that the unsatisfied flow still does not meet the criteria for being satisfied (and the bandwidth required by the flow is still greater than or equal to the average bandwidth allocated to the unsatisfied flows, that is $f_i \geq U_c/|U|$), step 1508 proceeds to step 1514. Similarly after step 1506, method 1500 proceeds to step 1514, where method 1100 proceeds to the next step in method 1100 (FIG. 11).

Method for Cessation of a Flow

FIG. 16A(1) shows a flowchart of an embodiment of method 1600 of handling the cessation of a flow. Method 1600 may be an embodiment of step 1122 of FIG. 11.

In step 1602, a determination is made whether flow that ended was satisfied or unsatisfied. If in step 1602 it is determined that the flow was a satisfied flow, method 1600 proceeds to step 1604.

In step 1604, procedure B (method 1000b, FIG. 10B) is implemented, and the bandwidth allocated to satisfied flows is decreased by the bandwidth that was previously allocated to the flow that ceased, and the bandwidth allocated to unsatisfied flows is increased to by the bandwidth previously allocated to the flow that ceased.

In other words, if the flow that ceased was satisfied, then the bandwidth allocated to that flow may be passed to $U_c$, according to the equation, $$\left(\left(\sum_{f_i \in S} f_i\right)' - f_j\right) + (U'_C + f_j) = \sum_{f_i \in S} f_i + U_C = TB$$

In other words, the new bandwidth allocated to unsatisfied flows $U_c$ is given by $U_c = (U'_c + f_j)$. One aspect of at least one embodiment of the invention that differs completely from other works is that to stop queuing completely one must predict future traffic. Predicting traffic flow may be done by watching the connections start. When a connection starts, the worst is assumed—that the connection is an unsatisfied flow. So the allocator reduces all other traffic. The reduction of the allocated bandwidth when a flow starts, combined with a growth function that increases the window of the flow, has the effect of stopping (or at least reducing) bursts, so that the total rate (including bursts) entering the bottleneck never exceeds the capacity of the connection and therefore queuing is minimized (or at least reduced and possibly eliminated). The acknowledgement-pacing, the window growth function, and the clamping of the window at the start of the flow reduces (e.g., eliminates) the chance for a flow to become bursty. Using the extra knowledge available about the bottleneck capacity, which is not available on other networks (edge networks are special cases), allows the system to eliminate the need for bandwidth probing and queuing. Optionally, deep packet inspections may be performed to predict how the flow will behave even for non-enforceable flows. That is, for non-conventional flows (e.g., bulk or short-lived flows), bursts can still be stopped and a high throughput can be maintained. Note that $((\Sigma_{f_i \in S} f_i)' - f_j) = \Sigma_{f_i \in S} f_i$, where $(\Sigma_{f_i \in S} f_i)'$ is the sum of satisfied flows prior to reallocating bandwidth and $\Sigma_{f_i \in S} f_i$ is the sum of satisfied flows after reallocating bandwidth.

After step 1604, method 1600 proceeds to step 1606.

In step 1606, the variable representing the number of satisfied flows is decremented by one, and the variable representing the number of unsatisfied flow is left unchanged. After, step 1606, method 1606 proceeds to step 1608.

In step 1608, the average bandwidth allocated to unsatisfied flows is adjusted, since the total bandwidth $U_c$ allocated to unsatisfied flows has increased by the bandwidth previously used by the flow that ceased. After step 1608, the method 1600 proceeds to step 1610, and the next step in method 1100 is performed.

Returning to step 1602, if in step 1602 it is determined that the flow is ending was an unsatisfied flow, method 1600 proceeds to step 1612.

In step 1612, the variable representing the number of unsatisfied flows (e.g., U) is decremented by one, and the variable representing the number of satisfied flow is left unchanged. When a flow ends, if the flow is unsatisfied there is nothing to do. More specifically, if an unsatisfied flow stops, the satisfied flows remain satisfied, and do not need to be checked. However, one may want to check if any of the previously unsatisfied flows are now satisfied a result of increase of bandwidth.

After, step 1612, method 1612 proceeds to step 1608, and the average bandwidth allocated to unsatisfied flows (Uc/|U|) is adjusted, since the average bandwidth allocated to unsatisfied bandwidths is increased as a result of U decreasing by one. As mentioned above, after step 1608, the method 1600 proceeds to step 1610, and the next step in method 1100 is performed.

Categorization Check

FIG. 16A(2) shows an embodiment of a method 1620 of checking the categorization of the flows, which may be performed after the ratio of Uc/|U| has increased. Since the ratio of Uc/|U| has increased, some previously unsatisfied flows may now be satisfied (despite being categorized as unsatisfied). Method 1620 may be performed after a flow reduction, a flow cessation, method 1620 may be an embodiment of at least a part of step 1111 of method 1100. Method 1620 may optionally start from the smallest flow that was previously not satisfied and continue until the first flow is found that should be classified as unsatisfied. Method 1620 checks flows starting from flows requiring smaller amounts of bandwidth, checking the flows in the order of from smaller flows to larger flows.

In step 1621 the next flow is checked, which may be the smallest previously unsatisfied flow that has not yet been set. In step 1622, a determination is made of whether the flow $f_i$ satisfies the equation $f_i < U_c/|U|$. If a determination is made that the flow does not satisfy $f_i < U_c/|U|$, then the flow remains classified as unsatisfied, and there is nothing more to do, because the current flow is already properly classified and the flows not checked only require greater bandwidths and therefore are also require too much bandwidth to satisfy, so the method 1620 ends, and method 1100 proceeds to the next step. If a determination is made that the flow does satisfy $f_i < U_c/|U|$, then the flow is reclassified as satisfied, and method 1620 proceeds to step 1624. In step 1624, Procedure A (method 1000a, FIG. 10A) is performed with the change in the flow being set equal to the entire bandwidth required by flow $f_i$. In step 1626, U is decreased by 1 and S is increased by 1, thereby increasing the ratio Uc/|U|. In step 1628, the ratio Uc/|U| is recalculated to account for the increase in the ratio Uc/|U|. After step 1628, the method returns to step 1622 to check the next flow.

In an alternative embodiment, one could start from the smallest flow and check all of the previously satisfied flows also, but that may involve checking more flows that necessary.

FIG. 16A(3) shows an embodiment of a method 1640 of checking the categorization of the flows, which may be performed after the ratio of Uc/|U| has decreases, so that some previously satisfied flows may now require too much bandwidth to be satisfied. Method 1640 may be performed after a flow increase or a flow start. Method 1620 may be an embodiment of at least a part of step 1111 of method 1100. Method 1640 may optionally start from the largest flow that was previously satisfied and continues searching the largest previously satisfied flow, not checked yet, until the first flow is found that should still be classified as satisfied. Method 1620 checks flows starting from flows requiring larger amounts of bandwidth, checking the flows in the order of from larger flows to smaller flows.

In step 1641 the next flow is checked, which may be the largest previously satisfied flow that was not checked, yet. In step 1642, a determination of whether the flow $f_i$ satisfies the equation $f_i < U_c/|U|$. If a determination is made that the flow does satisfy $f_i < U_c/|U|$, then the flow is satisfied, which is how the flow was previously classified, and there is nothing more to do, because the current flow is already properly classified and the flows not checked only require smaller bandwidths and therefore are also satisfied, so the method 1640 ends, and method 1100 proceeds to the next step. If a determination is made that the flow does not satisfy $f_i < U_c/|U|$, then the flow is reclassified as unsatisfied, and method 1640 proceeds to step 1644. In step 1644, Procedure B (method 1000b, FIG. 10B) is performed with the change in the flow being set equal to the entire band width required by flow $f_i$. In step 1646, U is increased by 1 and S is decreased by 1, thereby decreasing the ratio Uc/|U|. In step 1648, the ratio Uc/|U| is recalculated to account for the decrease in the ratio Uc/|U|. After step 1648, the method returns to step 1642 to check the next flow.

In an alternative, one could search from largest to smallest flows when Uc/|U| increases or one could search from smallest to largest flows when Uc/|U| decreases, but then it may be necessary to check all flows.

FIG. 16A(4) shows an embodiment of a method 1660, which may be an embodiment of step 1111 of FIG. 11. In step 1662 a determination is made as to whether Uc/|U| increased or decreased. If Uc/|U| increased, method 1660 implements method 1620. If Uc/|U| decreased, method 1660 implements method 1640. Optionally, if after implementing methods 1620, 1640, and/or 1660 results in a change of Uc/|U|, methods 1620, 1640, and/or 1660 may be repeated. In an embodiment, the bandwidth is allocated and/or reallocated as the computations of FIGS. 11-16A(4) are performed. Optionally, the computations of any and/or all of methods of FIGS. 11-16A(4) may be performed first, and then, after the computations are performed, the bandwidth may be allocated.

As a result of methods of FIGS. 11-16A(4), when the amount of bandwidth allocated to each flow may change, and in an embodiment in which the enforcer (e.g., congestion removal module 202) and the module computing the bandwidth to allocate to each flow (bandwidth allocator 216) are different modules, the module that computes the bandwidth (bandwidth allocator 216) may send a message to the enforcer (e.g., congestion removal module 202), which in response adjusts the bandwidth allocated to each flow (e.g., by adjusting the size of the window and the duration of time between acknowledgments—based on a different value for the rate, which may be given by the new value of $f_i$ or $U_c/|U|$).

Comparison of Present Methods to Prior Art

The FIGS. 16B-G compare the Netgear Nighthawk QoS to the present system. Netgear Nighthawk QoS is the most expensive premium residential router on the market, so Netgear Nighthawk QoS should be the greatest competition. The current system is superior for customer experience, and although not shown on the graphs, the current system does not drop packets and therefore helps ISPs with rental as well.

Rates

Although TCP is the bulk of Internet traffic, there are other flows that cannot be controlled. One solution is in the allocator (bandwidth allocator 216), subtract the bandwidth of the unenforceable flows (e.g., UDP-traffic) from the bottleneck bandwidth and use the remainder for the allocation algorithm.

Burst Experiment

Figure 16B:
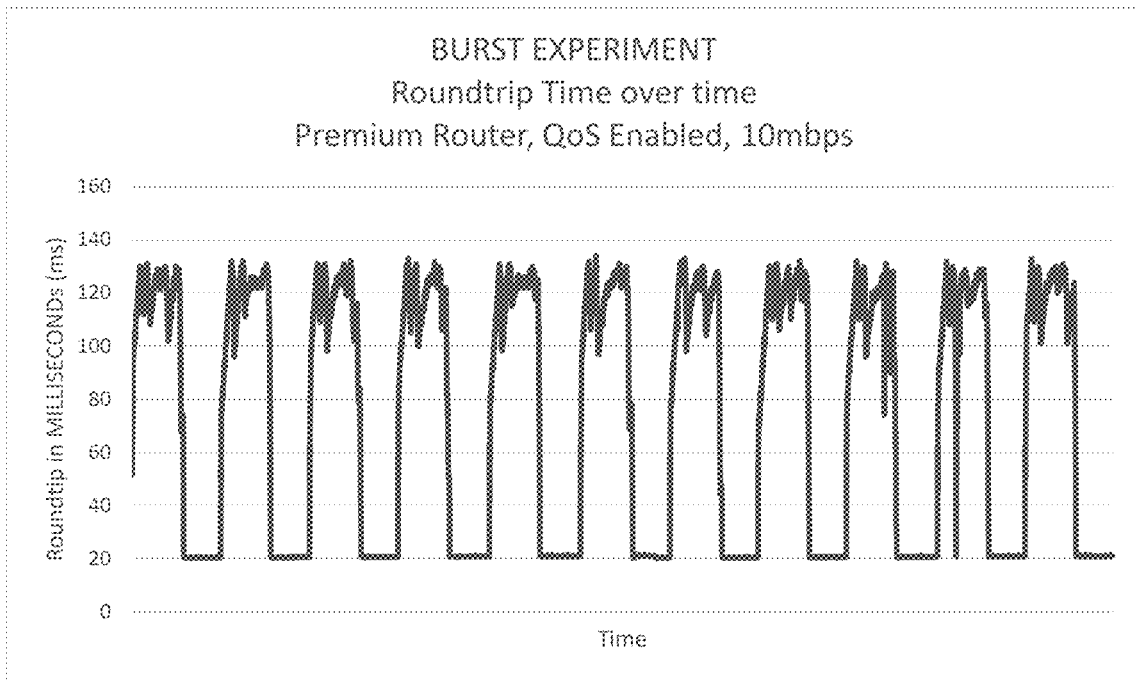
FIG. 16B is a plot, based on a simulation, which illustrates the round trip time for a packet sent, via a conventional high end router resulting from traffic occurring in 0.5 second bursts.
Figure 16C:
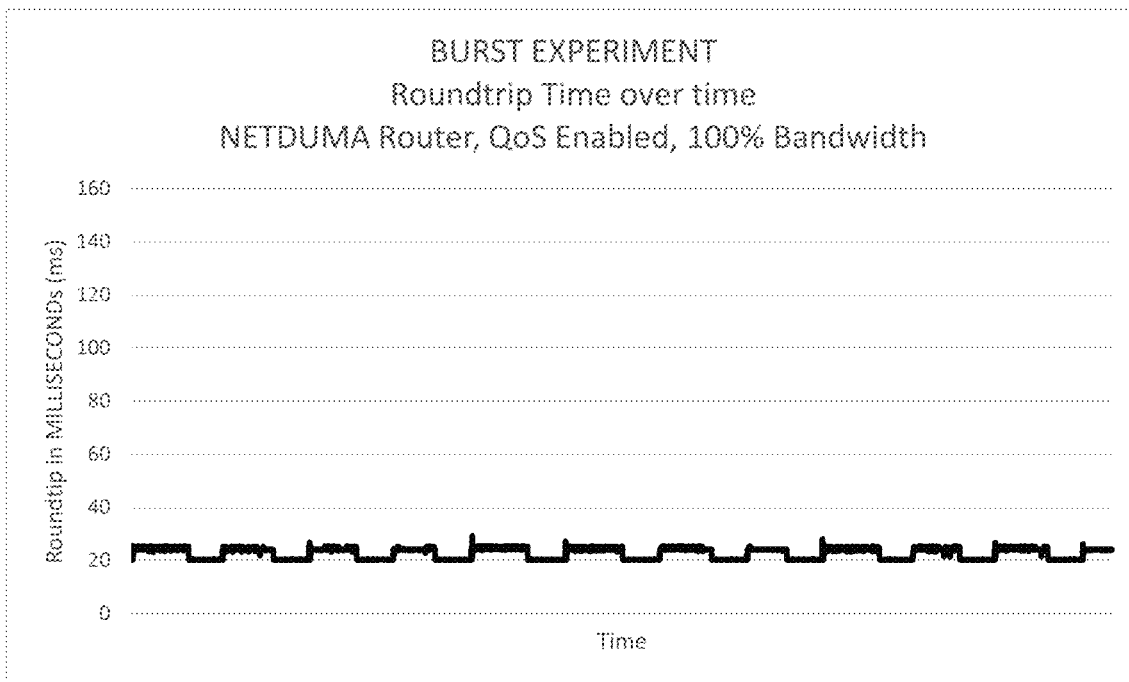
FIG. 16C is a plot, based on a simulation, which illustrates the round trip time for a packet sent, via a router implementing the techniques of this specification resulting from traffic occurring in 0.5 second bursts.

In FIGS. 16B and 16C, a simulation of web traffic was performed, with activity starting, and then stopping, in 0.5 second bursts. As one can see, the competitor has significant latency whereas a network device made according to the systems and methods of FIGS. 1-16 virtually removes all latency.

Latency Experiment

Figure 16D:
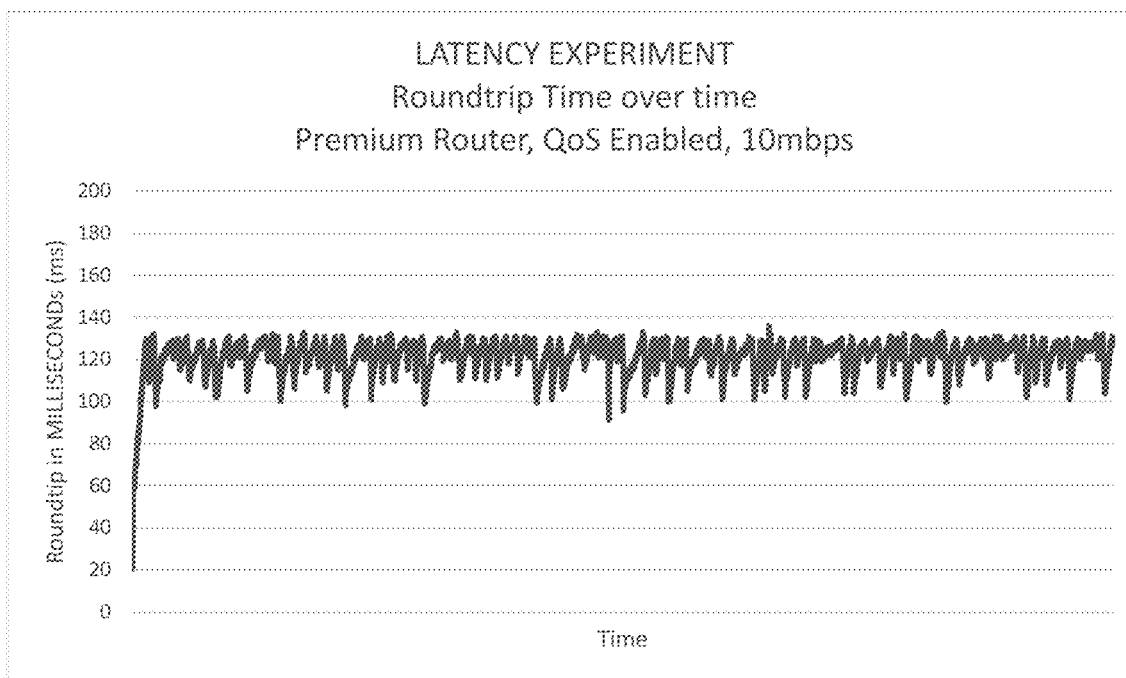
FIG. 16D is a plot of the round trip time for a packet sent, via a conventional high end router, during a continuous two-minute download based on a simulation.
Figure 16E:
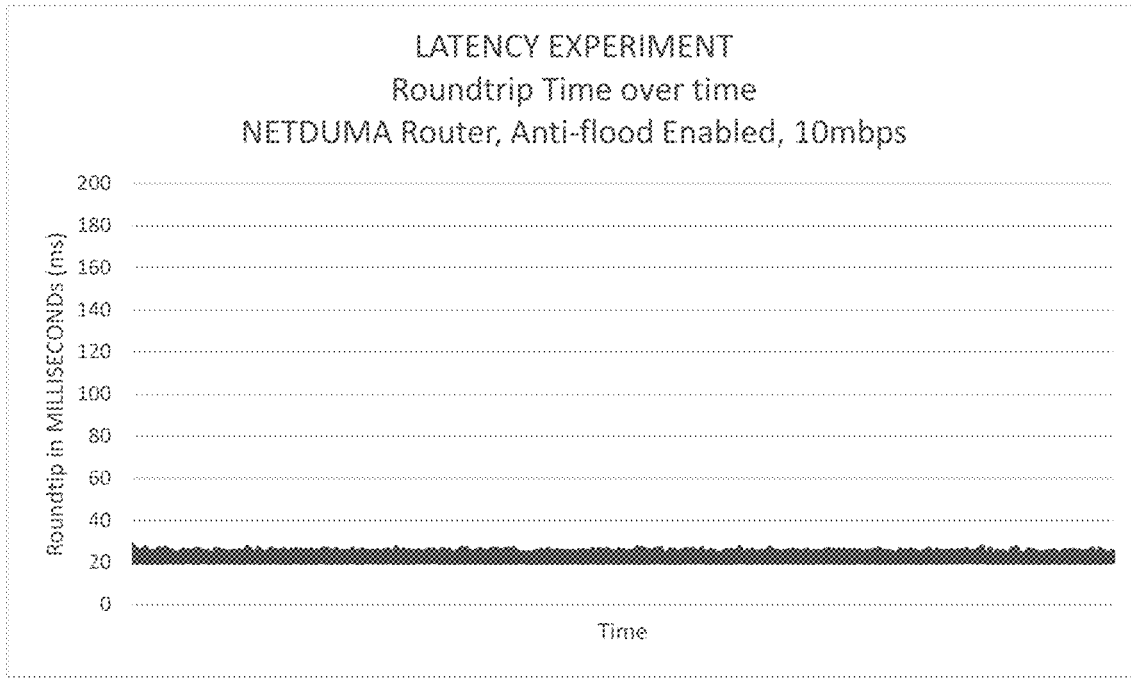
FIG. 16E is a plot of the round trip time for a packet sent, via a router implementing the techniques of this specification during a continuous two-minute download based on a simulation.

In FIGS. 16D and 16E, a simulation of a consistent download over a period of two-minutes was performed. As one can see, the competitor has significant latency whereas a network device made according to the systems and methods of FIGS. 1-16 virtually removes all latency.

Fairness Experiment

Figure 16F:
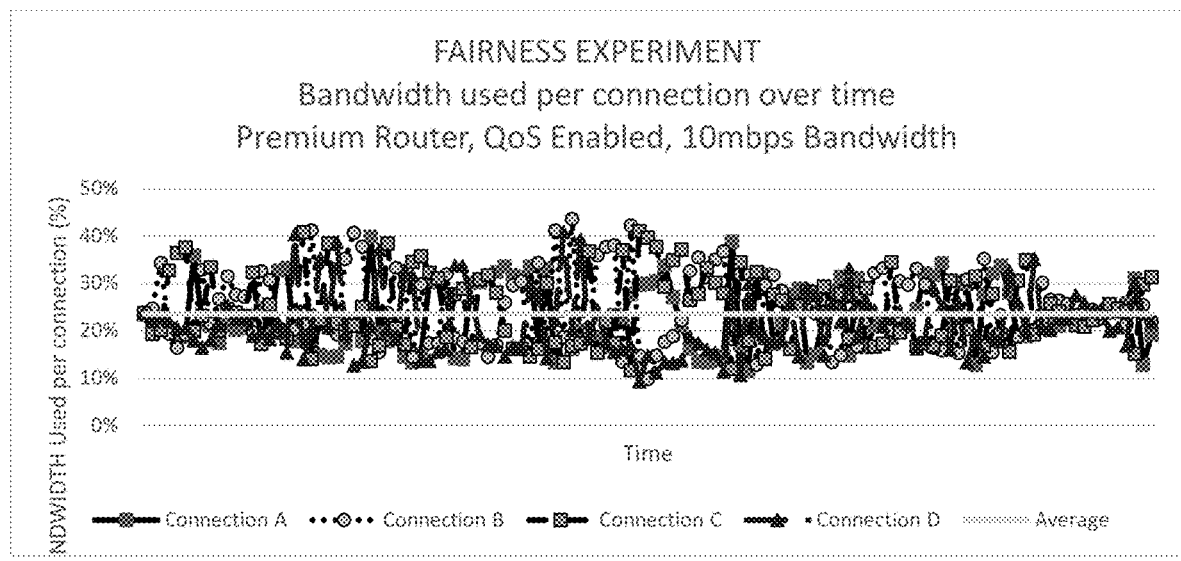
FIG. 16F shows the bandwidth allocated to each of four connections by a conventional high end router over a two-minute period, based on a simulation of network traffic.
Figure 16G:
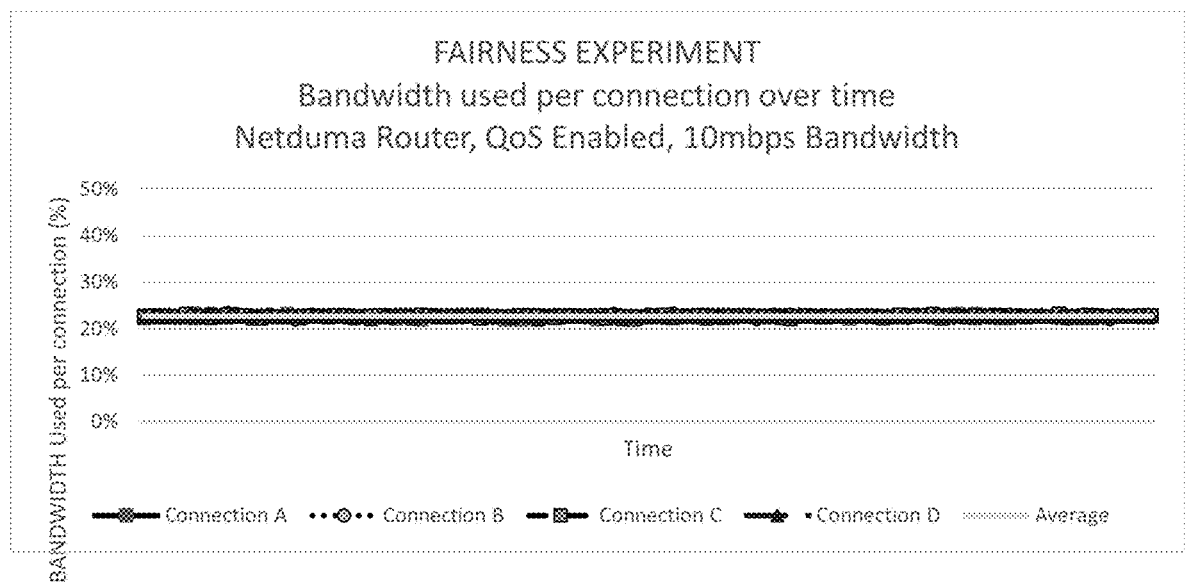
FIG. 16G shows the bandwidth allocated to each of four connections by a router implementing the methods of this specification over a two-minute period, based on a simulation of network traffic.

In FIGS. 16F and 16G, a simulation of four connections, each demanding bandwidth, was conducted. The straight line represents the average connection, with the other lines representing the bandwidth (goodput) received by each connection over a period of two-minutes. The competitor is unable to divide the bandwidth fairly amongst the connections, whilst the following methods in this specification achieve near optimum fairness.

Hardware

Figure 17:
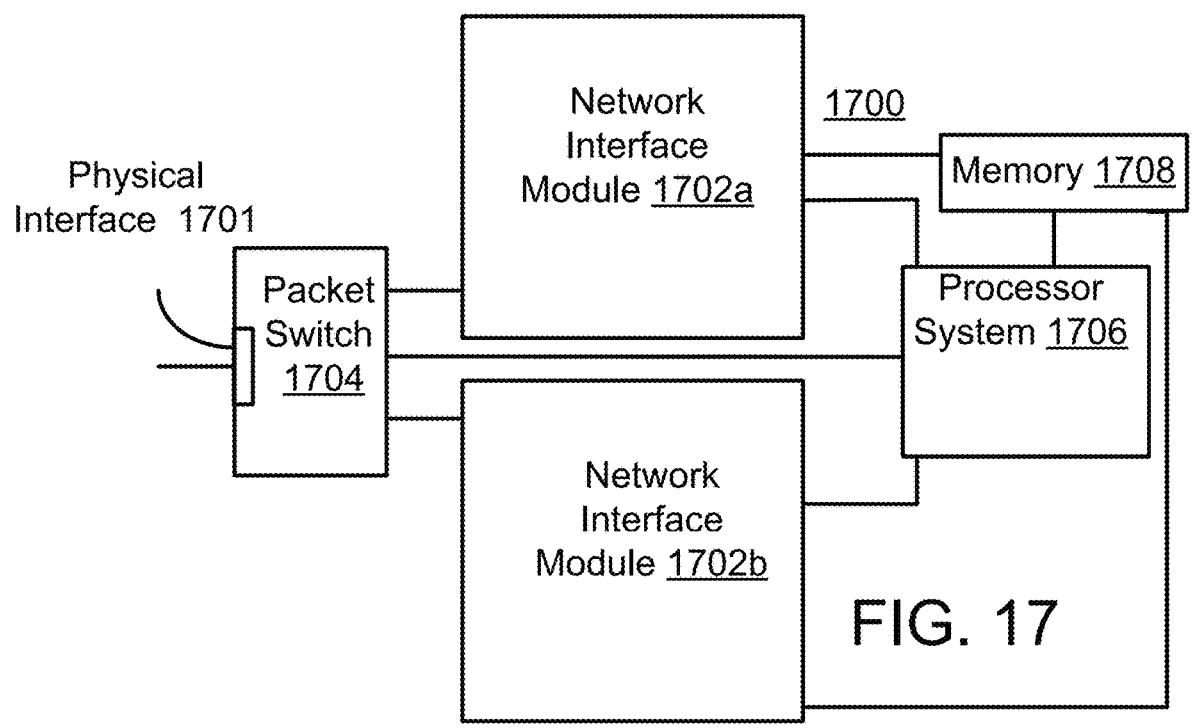
FIG. 17 shows a block diagram of an embodiment of a router that may be used in this specification.

FIG. 17 shows a block diagram of an embodiment of a router 1700. The router 1700 may include at least one physical interfaces 1701, associated with network interface modules 1702a and 1702b, respectively, an optional packet switch 1704, a processor system 1706, and memory system 1708. In another embodiment, router 1700 may have other elements in addition to, or instead of, those listed above.

Router 1700 may be an embodiment of any of routers 112a-n network and device 200. Physical interfaces 1701 is the physical connection to the network. The network interface module 1702a and/or 1702b may be a network card or other network interface module with similar functions. The network interface module 1702a and/or 1702b processes incoming packets, determine where to send the incoming packets and forwards the incoming packets to local devices, via processors. The network interface module 1702a and/or 1702b may receive packets, the optional packet switch, from the network and forward the packets, via a packet switch to another device in the network.

The packet switch 1704 (which is optional) connects the network interfaces 1702 to one another, the network and/or to the processor. Physical interface 1701 may be part of packet switch 1704, which connects packet switch 1704 to the network (optionally, physical interfaces may be located on network interface modules 1702a and 1702b instead of on packet switch 1704). Packets travel from one network interface module 1702a or 1702b to the optional packet switch 1704. Packets in the optional packet switch 1704 may travel from the network to the optional packet switch 1704 and/or to the processor, to a different network interface module 1702b or 1702a, or back to the same network interface 1702a or 1702b, respectively. The network interface modules 1702a or 1702b may include a physical interface to a network, such as the Internet. The network interface module 1702a or 1702b may be a network card or other network interface module with similar functions. The network interface module processes incoming packets, determines where to send the incoming packets and forwards the incoming packets to the optional packet switch. The network interface module also receives packets from the optional packet switch and forwards the packets to another device in the network.

The optional packet switch 1704 may be a hardware switch or may be a shared memory. If the optional packet switch 1704 is a shared memory, the packets may be sent to the optional packet switch 1704 and retrieved from the optional packet switch 1704 rather than the optional packet switch 1704 sending packets to other components.

The processor system 1706 receives packets from the optional packet switch 1704, determines the next destination for the packets, and then returns the packets to the optional packet switch 1704 to be forwarded to a network interface module 1702a and/or 1702b. When a group of packets originate from the same source and are headed for the same destination, one packet from the group may be processed by the processor system 1706, and the remaining packets may be processed by the network interface module 1702a and/or 1702b without being sent to the processor system 1706, and the network interface module 1702a and/or 1702b is configured to determine how to process other packets of the group based on the packet from the group that was processed by the processor system 1706. The processor system 1706 may include one or more processors. The processor system 1706 may include an interface to a console, such as a personal computer or game console. Processor system 1706 may include a microprocessor any of the modules of network device 200, and/or one of congestion control modules 116a-n.

The memory system 1708 may store information and instructions related to implementing protocols (such as TCP) that determine whether to allow a packet to pass from one network and/or device to another and/or what device in the network to forward the packet to (e.g., based on hop distance). Memory system 1708 may be an embodiment of memory system 232. Memory system 1708 may include algorithms for implementing any of the modules of network device 200.

Figure 18:
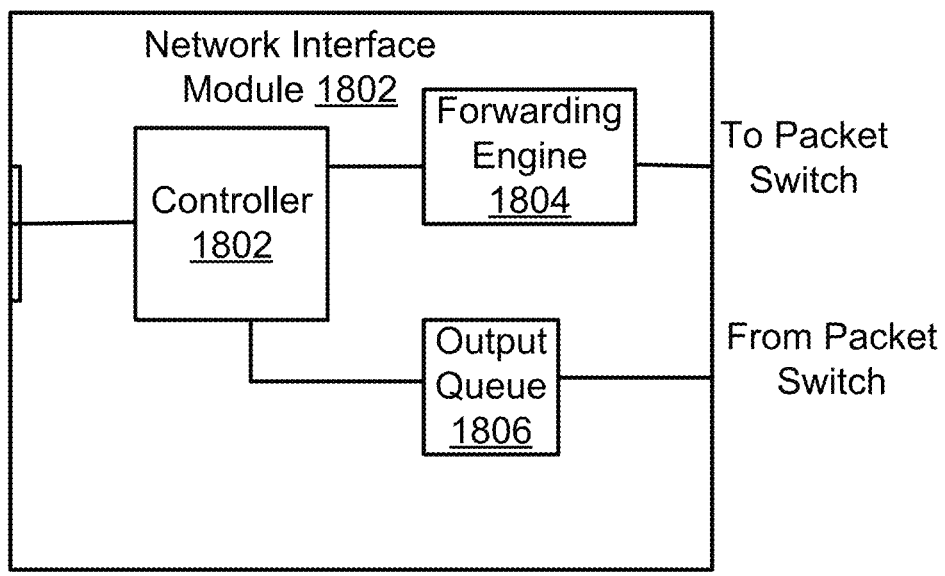
FIG. 18 shows an example of a network interface module that may be used in this specification.

FIG. 18 shows an example of a network interface module 1800. The network interface module may include a controller 1802, a forwarding engine 1804, and an output queue 1806. In another embodiment, network interface module 1800 may have other elements in addition to, or instead of, those listed above.

Network interface 1800 may be an embodiment of network interface module 1702a and/or 1702b. The controller 1802 controls the forwarding engine and output queue. The controller 1802 may have a memory for storing addresses of devices. The network interface 1800 of FIG. 18 may include a memory that stores machine instructions for the forwarding engine and the algorithm for enforcing and the algorithm for the allocator, as discussed above.

The forwarding engine 1804, which may be controlled by processor 1802, determines where to forward the packets, and then sends the packet to the optional packet switch, where the packets are forwarded to the destination determined by the forwarding engine. The output queue 1806 is a queue of packets from the optional packet switch, which are waiting to be sent by the controller to the next device in the network. The controller 1802 controls the forwarding engine 1804 and output queue 1806. Output queue 1806 may be an embodiment of any one of queues 114a-n.

The controller 1802 may have a memory for storing addresses of devices. The network interface 1800 of FIG. 18 may include a memory that stores machine instructions for the forwarding engine and the algorithm and/or modules for that enforces the bandwidth for each individual flow (e.g., congestion removal module 202 and/or the methods of FIGS. 3-16A(4)) and an algorithm for the allocates bandwidth (bandwidth allocator module 216 and/or the methods of FIGS. 9-16) to different devices, discussed above.

FIGS. 19A and B shows a block diagram of a console 1900a and b used in the system of FIG. 1. The console 1900a and b may include output system 1902a and b, input system 1904a and b, memory system 1906a and b storing Server module 1907.1a or b and queues 1907.2a or b, processor system 1908ssa and b, communications system 1912, and input/output device 1914a and b. In another embodiment, console 1900a and b may have other elements in addition to, or instead of, those listed above.

Console 1900a or b is an example of system that may be used for a server or a user system. Console 1900a and b may be embodiments of server 102 and/106.

Output system 1902a or b may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 1902a or b may send communications, via the router, to other systems connected to the network.

Input system 1904a or b may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 1904 may receive communications, via the router, from other systems connected to the network.

Memory system 1906a or b may include nontransient memory or nontransitory memory, such as, for example, any one of, some of, any combination of, or all of a long term storage system, such as a hard drive; a short term storage system, such as random access memory; a removable storage system, such as a floppy drive or a removable drive; and/or flash memory. Memory system 1906 may include one or more machine readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Memory system 1906a or b may store a browser and/or other interface for communication with or via the router.

Server module 1907.1a or b may send messages to edge networks 120a-n. Server module may implement a communications protocol, such as TCP, and sends messages at rates determined by the TCP or other communications protocol.

Queues 1907.2a or b may be embodiments of 108a-n.

Processor system 1908a or b may include any one of, some of, any combination of, or all of multiple parallel processors, a single processor, a system of processors having one or more central processors and/or one or more specialized processors dedicated to specific tasks. Also, processor system 1908a or b may include one or more Digital Signal Processors (DSPs) in addition to or in place of one or more Central Processing Units (CPUs) and/or may have one or more digital signal processing programs that run on one or more CPU.

Communications system 1912 communicatively links output system 1902b, input system 1904b, memory system 1906b, processor system 1908b, and/or input/output system 1914b to each other. Communications system 1912 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 1914a or b may include devices that have the dual function as input and output devices. For example, input/output system 1914a or b may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 1914a or b is optional, and may be used in addition to or in place of output system 1902a or b and/or input device 1904a or b. Input/output system 1914a or b may handle communications with other system in the network, via the router.

Alternatives and Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

SOME EXAMPLES OF EMBODIMENTS

Embodiment 1

A system comprising:
a processor system having one or more processors;
a memory system;
a bandwidth allocation module, which when activated, allocates bandwidth for an increase in flow of a previously satisfied flow from bandwidth that was allocated to unsatisfied flows, unless allocating flow to the previously satisfied flow will result in the previously satisfied flow having a greater bandwidth than an average bandwidth allocated to unsatisfied flows.

Embodiment 2

A system comprising:
a processor system having one or more processors;
a memory system;
a bandwidth allocation module including at least
a bandwidth balance module configured to balance an allocation of bandwidth between satisfied and unsatisfied flows, by at least deallocating an amount of bandwidth from satisfied flows in exchange for allocating that amount of bandwidth for unsatisfied flows, and deallocating an amount of bandwidth from unsatisfied flows in exchange for allocating that amount of bandwidth for satisfied flows; and
a fairness module configured to allocate to individual satisfied flows an amount of bandwidth that is no more than an amount of bandwidth that is an average amount of bandwidth allocated to unsatisfied flows.

Embodiment 3

A system comprising:
a processor system having one or more processors;
a memory system;
a window module configured to overwrite header information of an acknowledgement message segment, prior to the message being sent, the header information being over written with information, which when consumed by a server causes the server to set a window length, the window length being a maximum amount of information to send prior to receiving an acknowledgement; and
a pacing module configured to send an acknowledgement of a message, prior to the window expiring, therein shifting the window.

Embodiment 4

The system of any of embodiments 1-33, in which the information consumed by the server causes the server to set the window to be large enough to allow for a sending of a message and receipt of an acknowledgement.

Embodiment 5

The system of any of embodiments 1-33, the window being a whole number of message segment sizes, the whole number being a maximum number of message segment sizes required, that fit into the smallest duration of time sufficient sending of an acknowledgement and receiving a message.

Embodiment 6

The system of any of embodiments 1-33, the window having a size given by a round trip time (RTT) times a data flow rate allocated to the system or that the system can accept without queuing messages received, rounded down to a size that is a whole number of maximum segment sizes.

Embodiment 7

The system of any of embodiments 1-33, the system being configured such that acknowledgements are sent at a rate that reduces queueing of messages sent to the system.

Embodiment 8

The system of any of embodiments 1-33, the system being configured such that acknowledgements being sent at a rate that minimizes queueing of messages sent to the system.

Embodiment 9

The system of any of embodiments 1-33, the system being configured such that acknowledgements being sent at a rate that eliminates queueing of messages sent to the system.

Embodiment 10

The system of any of embodiments 1-33, the system being configured such that acknowledgements are sent at times that are spaced by an amount of time required for sending a message having a size of one maximum message size (mms).

Embodiment 11

The system of any of embodiments 1-33, the system being configured such that acknowledgements are sent at a rate given by a maximum message size (mms) divided by a rate allocated to the system or a rate at which messages can be received at the system without queuing the messages received at the system, given by the formula, mss/rate.

Embodiment 12

The system of any of embodiments 1-33, the system being configured such that at start up, the window is set to a size that is smaller than a round trip time (RTT) times a data flow rate that the system is allocated or can accept without queuing messages received.

Embodiment 13

The system of any of embodiments 1-33, the system being configured to determine an initial round trip time by measuring how much time passes between sending an acknowledgement and receiving message.

Embodiment 14

The system of any of embodiments 1-33, the system being configured to measure around trip time periodically, if a shorter round trip time is measured than a round trip time currently stored, replacing the round trip time currently stored with the shorter round trip time.

Embodiment 15

The system of any of embodiments 1-33, the system being configured such that if a shorter round trip time is measured than a round trip time currently stored, the window is recalculated using the shorter round trip time.

Embodiment 16

The system of any of embodiments 1-33, the system being configured to remeasure flows periodically and adjust bandwidth allocated to each flow based on the remeasure of the flows.

Embodiment 17

The system of any of embodiments 1-33, the system being configured to allocate to each unsatisfied flow an equal amount of bandwidth from bandwidth allocated to unsatisfied flows, an unsatisfied flow being a flow that requires more bandwidth than being allocated to the flow.

Embodiment 18

The system of any of embodiments 1-33, the system being configured such that when a new flow is detected, the new flow is allocated with an amount of bandwidth taken from bandwidth allocated for unsatisfied flows.

Embodiment 19

The system of any of embodiments 1-33, the system being configured such that when a flow is ceases, bandwidth, that was previous allocated to the ceased flow, is reallocated to unsatisfied flows.

Embodiment 20

The system of any of embodiments 1-33, the system being configured such that when a satisfied flow decreases an amount of bandwidth that is required to be satisfied, bandwidth that is no longer required to satisfy the satisfied flow is reallocated to unsatisfied flows.

Embodiment 21

The system of any of embodiments 1-33, the system being configured such that when an unsatisfied flow decreases an amount of bandwidth required to be satisfied to an amount of bandwidth that is less than an average amount of bandwidth allocated to unsatisfied flows, bandwidth that is no longer being used by the flow is reallocated to unsatisfied flows.

Embodiment 22

The system of any of embodiments 1-33, the system being configured such that when a previously satisfied flow increases an amount of bandwidth required to remain satisfied,
a determination is made whether reallocating bandwidth from unsatisfied flows to the previously satisfied flow will result in the previously satisfied flow being allocated more bandwidth than the average bandwidth allocated to unsatisfied flows,
if reallocating bandwidth from unsatisfied flows to the previously satisfied flow will result in the previously satisfied flow being allocated more bandwidth than the average bandwidth allocated to unsatisfied flows, ceasing to allocate to the previously satisfied flow an amount of bandwidth required to keep the previously satisfied flow satisfied, adding the flow allocated to the previously satisfied flow to the bandwidth allocated to unsatisfied flows, and allocating to the flow an amount of bandwidth that is an average of bandwidth allocated to unsatisfied flows; and
if reallocating bandwidth from unsatisfied flows to the previously satisfied flow will not result in the previously satisfied flow being allocated more bandwidth than the average bandwidth allocated to unsatisfied flows, reallocating enough bandwidth from the unsatisfied flows to keep the previously satisfied flow satisfied, therein decreasing the average bandwidth allocated to unsatisfied flows.

Embodiment 23

The system of any of embodiments 1-33, configured such that when an unsatisfied flow increases an amount of bandwidth required to be satisfied, the amount of bandwidth allocated to unsatisfied flows remains unchanged in response to the increase.

Embodiment 24

The system of any of embodiments 1-33, the system being configured such that when an average of bandwidth allocated to previously unsatisfied flows increases, previously unsatisfied flows are checked to determine whether there are previously unsatisfied flows that are now satisfied, if there is a previously unsatisfied flow found that is now satisfied, bandwidth currently allocated to the previously unsatisfied flow found that is not needed to satisfy the previously unsatisfied flow being reallocated to previously unsatisfied flows that have not been determined to be currently satisfied.

Embodiment 25

The system of embodiments of any of embodiments 1-33, the system being configured such that when an average of bandwidth allocated to unsatisfied flows decreases, flows that were previously satisfied are checked to determine whether there are previously satisfied flows that require more bandwidth to remain satisfied than the average bandwidth allocated to unsatisfied flows,
if there are previously satisfied flows that require more bandwidth to remain satisfied than the average bandwidth allocated to unsatisfied flows, the bandwidth allocated to previously satisfied flows that require more bandwidth to remain satisfied than the average bandwidth allocated to unsatisfied flows is reallocated, to currently unsatisfied flows, where the currently unsatisfied flows now includes and there previously satisfied flows that required more bandwidth to remain satisfied than the average bandwidth allocated to unsatisfied flows.

Embodiment 26

A method comprising:
altering, by a machine, header information of a message to specify a window within which to receive information, so that the messages will be sent at a rate that corresponds to the a bandwidth allocated to a flow of data associated with the network or at a rate that the flow of data associated with the network can receive messages; and
sending the message, via the machine, to a server sending messages to the user machine.

Embodiment 27

The method of any of embodiments 1-33, further comprising pacing when acknowledgements of messages are sent to control window growth.

Embodiment 28

The method of any of embodiments 1-33, further comprising pacing when acknowledgements of messages are sent to avoid bursts.

Embodiment 29

The method of any of embodiments 1-33, further comprising pacing when acknowledgements of messages are sent to avoid latency.

Embodiment 30

The method of any of embodiments 1-33, wherein bursts are prevented throughout a flows lifetime.

Embodiment 31

A method comprising:
allocating, by a machine, bandwidth to a plurality of flows such that satisfied flows require less bandwidth than an amount of bandwidth allocated to each unsatisfied flow

Embodiment 32

The method of any of embodiments 1-33 in which the average bandwidth allocated to each unsatisfied flow is a value that is a maximum average bandwidth obtainable, while allocating an equal amount of bandwidth to each unsatisfied flow, allocating no more bandwidth to satisfied flows than required to allocate to keep satisfied flows satisfied, while keeping a maximum bandwidth allocated to any satisfied flow to be less than the average bandwidth allocated to unsatisfied flows.

Embodiment 33

The method of any of embodiments 1-33, where the unsatisfied flows are allocated a uniform bandwidth that is greater than all satisfied flows, and satisfied flows get a minimum amount of bandwidth to satisfy the satisfied flows.

The invention claimed is:
1. A method comprising:
allocating, by a machine, bandwidth to each of a plurality of flows that is adequate to satisfy the plurality flows, such that each flow that is allocated enough bandwidth to be satisfied, requires less bandwidth to be satisfied than an amount of bandwidth allocated to each unsatisfied flow, or less bandwidth than a bandwidth that is based on an average bandwidth allocated to flows of the plurality of flows that are unsatisfied flows,
the machine including a processor system including at least one processor and a memory system;
the method including at least,
(1) determining that a previously satisfied flow has increased an amount of bandwidth required to remain satisfied,
(2) determining whether reallocating bandwidth from the unsatisfied flows to the previously satisfied flow will result in the previously satisfied flow being allocated more bandwidth than a threshold bandwidth, the threshold bandwidth being the average bandwidth allocated to the unsatisfied flows or being is based on the average bandwidth allocated to the unsatisfied flows,
(3) if reallocating bandwidth from the unsatisfied flows to the previously satisfied flow will result in the previously satisfied flow being allocated more bandwidth than the threshold threshold bandwidth, ceasing to allocate the previously satisfied flow an amount of bandwidth required to keep the previously satisfied flow satisfied, adding the bandwidth allocated to the satisfied flow to the bandwidth allocated to the unsatisfied flows, and allocating to the previously satisfied flow an amount of bandwidth, the amount of bandwidth being the average of the bandwidth allocated to the unsatisfied flows or being a bandwidth that is based on the average of bandwidth allocated to the unsatisfied flows; and
(4) if reallocating bandwidth from the unsatisfied flows to the previously satisfied flow will not result in the previously satisfied flow being allocated more bandwidth than the threshold bandwidth, reallocating enough bandwidth from the unsatisfied flows to keep the previously satisfied flow satisfied, therein decreasing the average bandwidth allocated to the unsatisfied flows.

2. The method of claim 1, wherein bandwidth allocated to keep a flow satisfied is taken from unsatisfied flows.

3. The method of claim 1, detecting that a flow is new, categorizing the flow as unsatisfied; and reallocating bandwidth already allocated to unsatisfied flows to the new flow.

4. The method of claim 1, detecting that a flow ceased; and reallocating bandwidth previously allocated to the ceased flow to unsatisfied flows.

5. The method of claim 1, further comprising detecting that an unsatisfied flow increased an amount of bandwidth required to be satisfied, in response, leaving an amount of bandwidth allocated to the unsatisfied flow unchanged.

6. The method of claim 1, detecting that a satisfied flow decreased an amount of bandwidth that is required to remain satisfied, and in response reallocating from the satisfied flow to unsatisfied flows bandwidth that is no longer required to satisfy the satisfied flow.

7. The method of claim 1, further comprising:

after an action that causes an increase in the average bandwidth allocated to previously unsatisfied flows, determining whether there are previously unsatisfied flows that have been allocated more bandwidth than the previously unsatisfied flow requires to be satisfied, if there is previously unsatisfied flow that has been allocated more bandwidth than the previously unsatisfied flow requires to be satisfied, then reallocating to unsatisfied flows bandwidth that is currently allocated to the previously unsatisfied flow that is not needed to satisfy the previously unsatisfied flow.

8. The method of claim 1, further comprising:

after an action that causes a decrease in the average bandwidth allocated to unsatisfied flows, checking previously satisfied flows to determine whether there are previously satisfied flows that require more bandwidth to remain satisfied than the average bandwidth allocated to unsatisfied flows, if there are previously satisfied flows that require more bandwidth to remain satisfied than the average bandwidth allocated to unsatisfied flows, reallocating to unsatisfied flows the bandwidth allocated to the previously satisfied flows that require more bandwidth to remain satisfied than the average bandwidth allocated to unsatisfied flows, and the previously satisfied flows that require more bandwidth to remain satisfied than the average bandwidth allocated to unsatisfied flows being allocated less bandwidth than required to remain satisfied, therein causing the previously satisfied flows that require more bandwidth to remain satisfied than the average bandwidth allocated to satisfied flows to be unsatisfied.

\* \* \* \* \*